(12) United States Patent　　　　(10) Patent No.:　US 12,677,308 B2

Papaleo et al.　　　　　　　　　　　(45) Date of Patent:　　　Jul. 7, 2026

(54) CO-CHANNEL COEXISTENCE OF ULTRA-WIDEBAND DEVICES WITH WIRELESS TELECOMMUNICATION DEVICES

(71) Applicant: Qualcomm Incorporated, San Diego, CA (US)

(72) Inventors: Marco Papaleo, Bologna (IT); Ebraam Adel Khalifa, Ottensoos (DE); Aleksandar Damnjanovic, Del Mar, CA (US); Brian A. Redding, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/460,052

(22) Filed: Sep. 1, 2023

(65) Prior Publication Data

US 2025/0081223 A1　　Mar. 6, 2025

(51) Int. Cl.
| | |
|---|---|
| *H04B 3/10* | (2006.01) |
| *H04L 5/00* | (2006.01) |
| *H04W 64/00* | (2009.01) |
| *H04W 72/541* | (2023.01) |

(52) U.S. Cl.
CPC ......... *H04W 72/541* (2023.01); *H04L 5/0048* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2013/0201884 A1* | 8/2013 | Freda .................... | H04L 5/0055 370/278 |
| 2021/0250775 A1* | 8/2021 | Hardin ................ | H04W 52/367 |
| 2021/0399761 A1* | 12/2021 | Parthasarathi ....... | H04B 7/0602 |
| 2022/0386069 A1 | 12/2022 | Henry et al. | |
| 2023/0045705 A1 | 2/2023 | Nabki et al. | |

(Continued)

FOREIGN PATENT DOCUMENTS

| | | | | |
|---|---|---|---|---|
| CN | 111163431 B | * | 11/2021 | .......... H04W 64/006 |
| WO | 2022169619 A1 | | 8/2022 | |

OTHER PUBLICATIONS

International Search Report and Written Opinion issued in PCT/US2024/044059, mailed Nov. 26, 2024, EPO, 15 pages.

(Continued)

*Primary Examiner* — Maharishi V Khirodhar

(74) *Attorney, Agent, or Firm* — Dinsmore & Shohl LLP

(57)　　　　　ABSTRACT

Certain aspects of the present disclosure provide techniques for the coexistence of wireless telecommunication devices (e.g., 4G, 5G, and/or 6G devices) and UWB devices operating in a same frequency band. A method generally includes receiving, from a first user equipment (UE), first signaling indicating an initiation of a first ultra-wideband ranging session between the first UE and an ultra-wideband device; determining a location of the first UE after receiving the first signaling; and performing one or more first interference mitigation processes configured to reduce channel interference in a first ultra-wideband channel used for the first ultra-wideband ranging session based on, at least, the location of the first UE.

30 Claims, 14 Drawing Sheets

(56) References Cited

U.S. PATENT DOCUMENTS

2025/0184689 A1 *  6/2025  Ramachandran ..... G01S 13/765

OTHER PUBLICATIONS

3GPP TS 38.213: "3rd Generation Partnership Project, Technical Specification Group Radio Access Network, NR, Physical Layer Procedures for Control (Release 17)", 3GPP TS 38.213, V17.6.0, Jun. 26, 2023, pp. 1-263.
3GPP TS 38.214: "3rd Generation Partnership Project, Technical Specification Group Radio Access Network, NR, Physical layer procedures for data (Release 17)", 3GPP TS 38.214, V17.6.0, Jun. 26, 2023, pp. 1-231.

* cited by examiner

500

Example UWB Target Frequencies

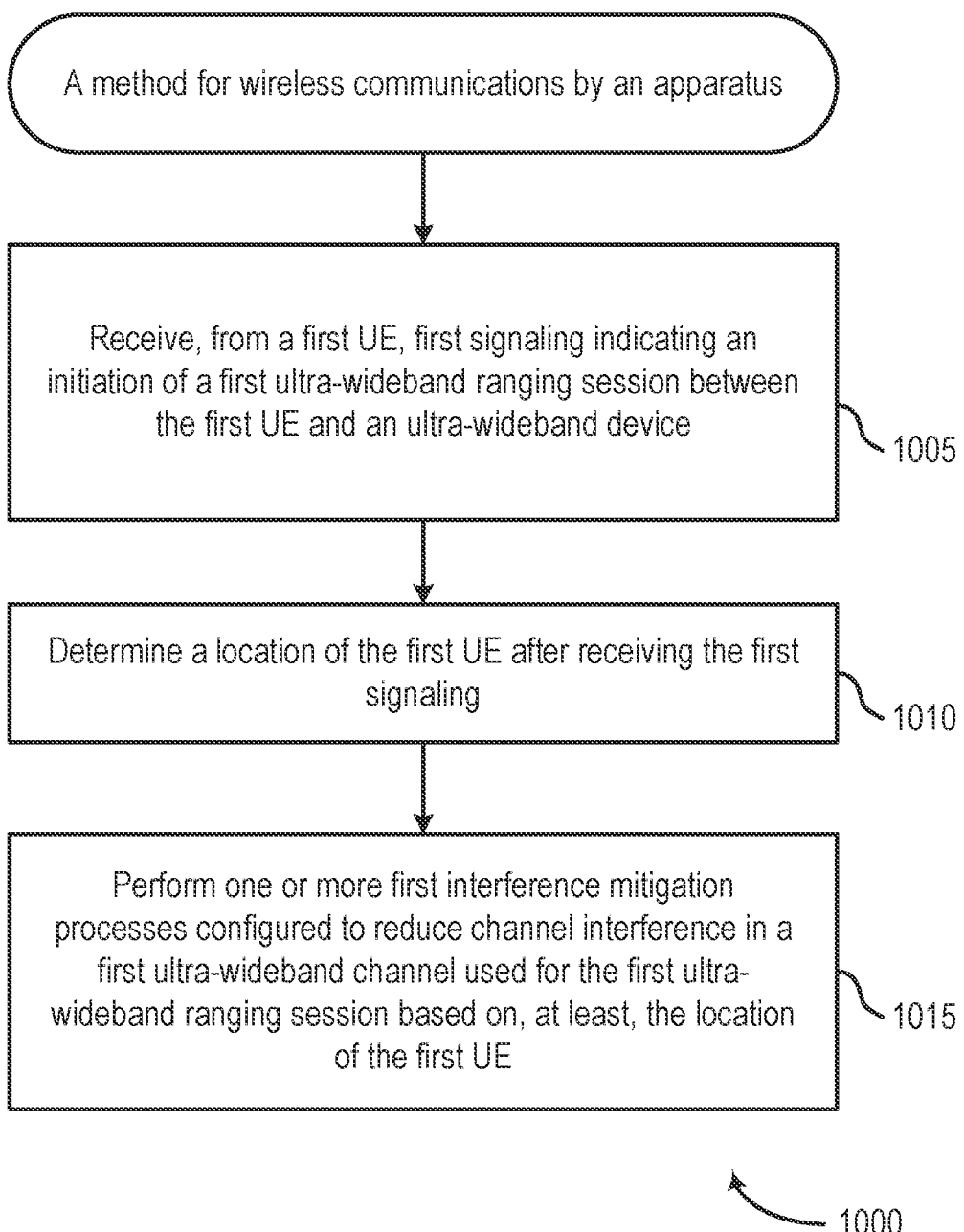

A method for wireless communications by an apparatus

Receive, from a first UE, first signaling indicating an initiation of a first ultra-wideband ranging session between the first UE and an ultra-wideband device

1005

Determine a location of the first UE after receiving the first signaling

1010

Perform one or more first interference mitigation processes configured to reduce channel interference in a first ultra-wideband channel used for the first ultra-wideband ranging session based on, at least, the location of the first UE

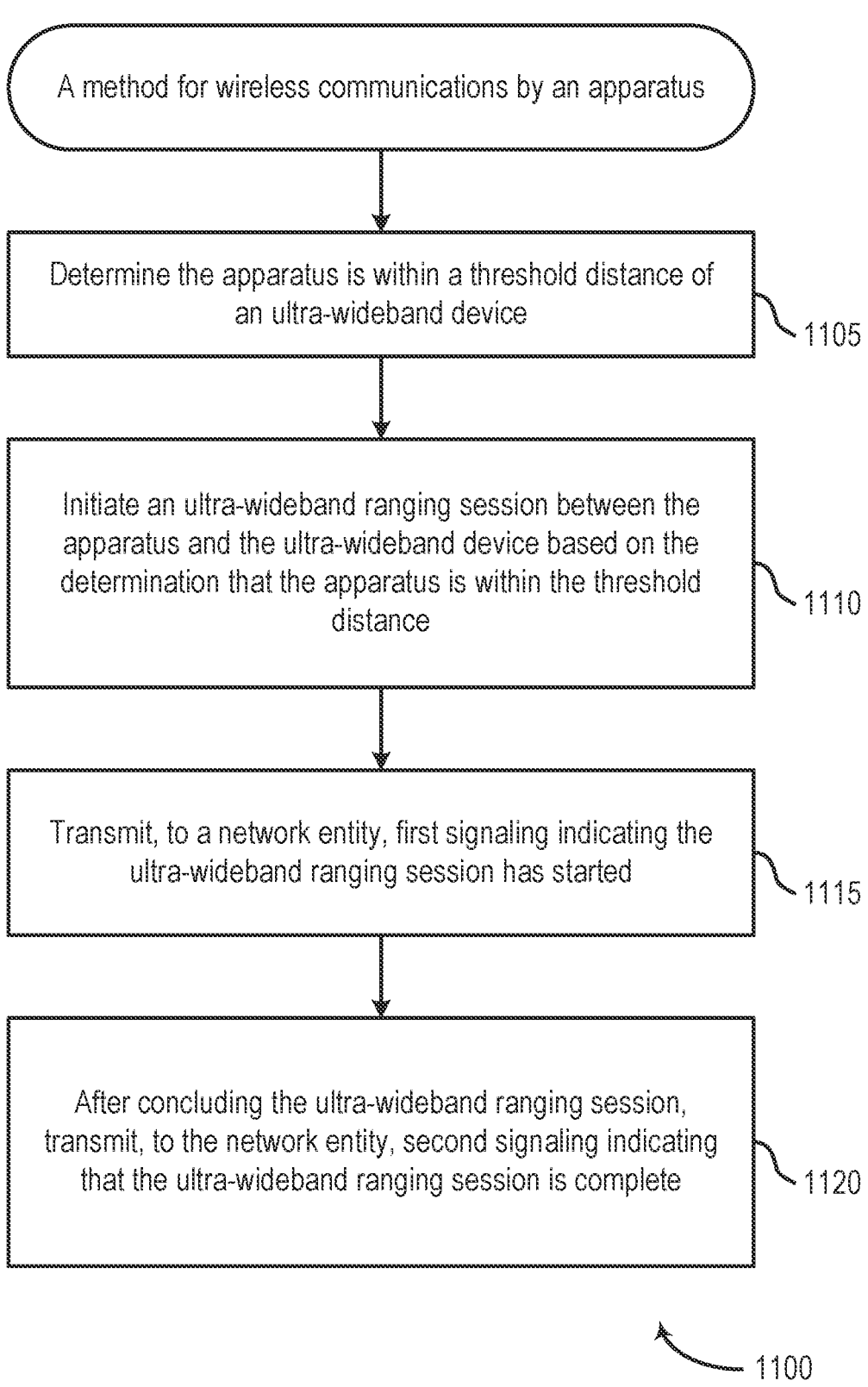

A method for wireless communications by an apparatus

Determine the apparatus is within a threshold distance of an ultra-wideband device ⟍ 1105

Initiate an ultra-wideband ranging session between the apparatus and the ultra-wideband device based on the determination that the apparatus is within the threshold distance ⟍ 1110

Transmit, to a network entity, first signaling indicating the ultra-wideband ranging session has started ⟍ 1115

After concluding the ultra-wideband ranging session, transmit, to the network entity, second signaling indicating that the ultra-wideband ranging session is complete ⟍ 1120

CO-CHANNEL COEXISTENCE OF ULTRA-WIDEBAND DEVICES WITH WIRELESS TELECOMMUNICATION DEVICES

INTRODUCTION

Field of the Disclosure

Aspects of the present disclosure relate to wireless communications, and more particularly, to techniques for the coexistence of wireless telecommunication devices (e.g., 4G, 5G, and/or 6G devices) and ultra-wideband devices operating in a same frequency band.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes receiving, from a first user equipment (UE), first signaling indicating an initiation of a first ultra-wideband ranging session between the first UE and an ultra-wideband device; determining a location of the first UE after receiving the first signaling; and performing one or more first interference mitigation processes configured to reduce channel interference in a first ultra-wideband channel used for the first ultra-wideband ranging session based on, at least, the location of the first UE.

Another aspect provides a method for wireless communications by an apparatus. The method includes determining the apparatus is within a threshold distance of an ultra-wideband device; initiating an ultra-wideband ranging session between the apparatus and the ultra-wideband device based on the determination that the apparatus is within the threshold distance; transmitting, to a network entity, first signaling indicating the ultra-wideband ranging session has started; and after concluding the ultra-wideband ranging session, transmitting, to the network entity, second signaling indicating that the ultra-wideband ranging session is complete.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts a method for wireless communications.

FIG. 11 depicts another method for wireless communications.

DETAILED DESCRIPTION

Figure 1:
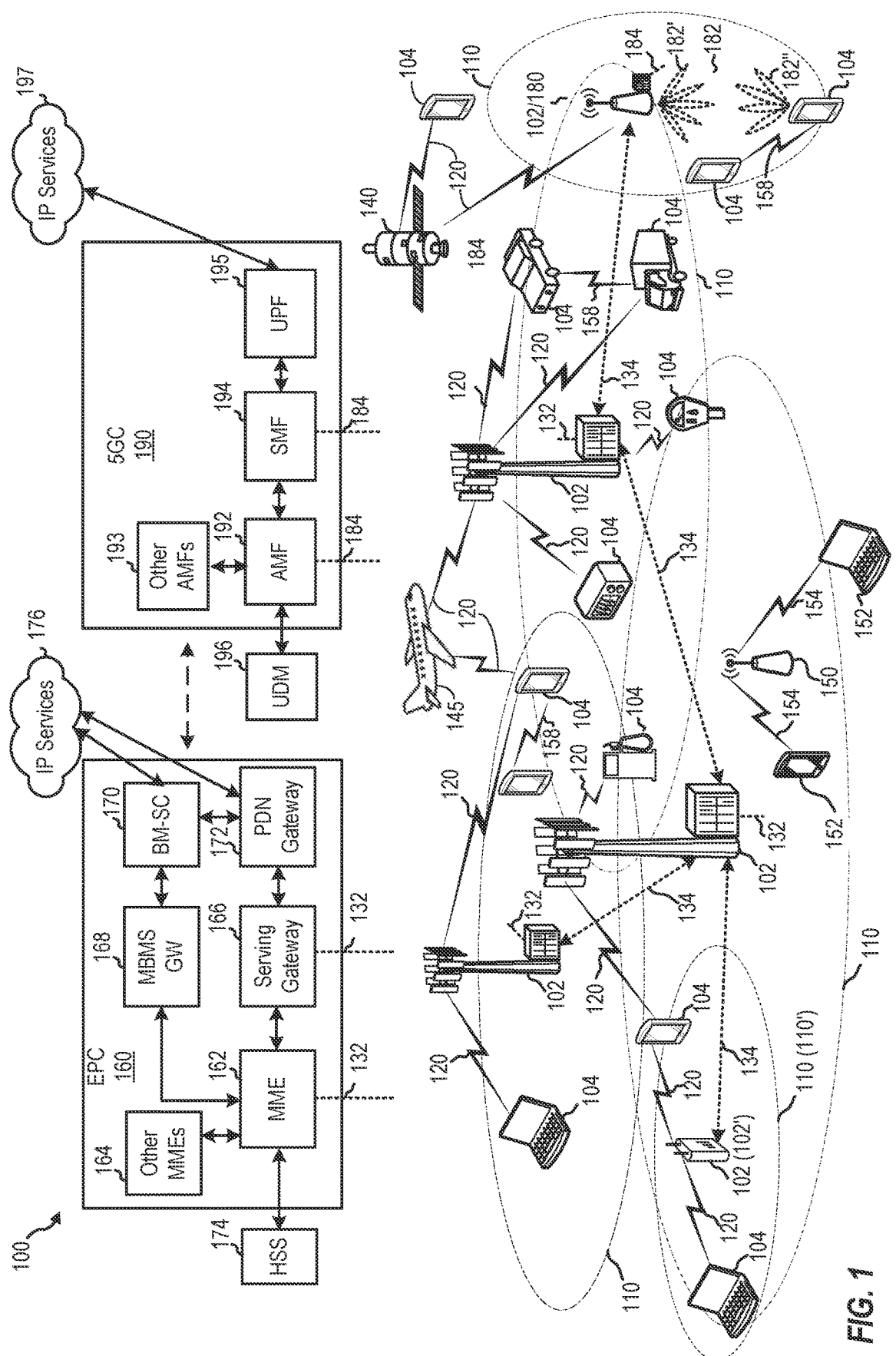
FIG. 1 depicts an example wireless communications network.

Aspects of the present disclosure relate to techniques for mitigating interference to ultra-wideband (UWB) device(s) when operating in a same frequency band as wireless telecommunication device(s) (e.g., 4G, 5G, and/or 6G device(s)). In other words, aspects described herein provide techniques for achieving co-channel coexistence among wireless telecommunication device(s) and UWB device(s).

Coexistence refers to the functioning of different types of wireless devices (e.g., operating according to different standards, using different technologies such as UWB or cellular technologies, etc.) in a same frequency band. While it may be ideal to have different frequencies for different types of wireless devices, the frequency spectrum is limited. Further, the growing number of types of wireless devices, makes it difficult, and, in some cases, impossible, to allocate separate frequency spectrum for each type of wireless device. As such, the frequency spectrum may be shared among different types of wireless devices.

For example, portions of the frequency spectrum may be shared among UWB devices and wireless telecommunication devices. UWB is a low-power, short-range, high bandwidth radio technology that offers precise positioning and tracking. UWB is a direct connection between two UWB devices that consists of radio wave bursts being transmitted and received. These "pulse-based" radio waves are used to measure location by precisely timing how long it takes each radio pulse to travel between the two UWB devices.

UWB technology targets using UWB channel 5 spectrum corresponding to a frequency band of 6,240 megahertz (MHz)-6,740 MHz, UWB channel 9 spectrum corresponding to a frequency band of 7,740 MHz-8,240 MHz, and UWB channel 10 spectrum corresponding to a frequency band of 8,240 MHz-8,740 MHz. Unfortunately for UWB technology, however, UWB devices may need to operate in such frequency ranges with other wireless telecommunication devices (e.g., such as 4G, 5G, and/or 6G-enabled network entities). As such, channel interference caused by UWB device(s) and wireless telecommunication device(s) communicating over a same frequency range, especially in areas of high-throughput and/or a large number of devices, may be inevitable, unless mitigation techniques are applied to minimize and/or avoid channel interference altogether. Channel interference caused by the coexistence of wireless telecommunication devices and UWB devices operating in the same frequency band may result in lost data, inefficient ranging sessions between UWB devices, and/or adversely impact sensitive UWB devices.

Accordingly, aspects described herein provide techniques for mitigating channel interference to achieve co-channel coexistence among wireless telecommunication device(s) and UWB device(s). For example, one or more network entities (e.g., example wireless telecommunication device (s)) operating in a same frequency band as one or more UWB devices engaged in a UWB ranging session and/or located near a UWB ranging session may perform one or more interference mitigation processes. Such process(es) may help to reduce interference in a frequency band used for the UWB ranging session and cellular (e.g., 4G, 5G, and/or 6G) communication. Various interference mitigation processes, described in detail below, may be considered to reduce the channel interference.

In some aspects, a network entity is triggered to perform interference mitigation process(es) based on receiving signaling from a UWB-enabled UE (e.g., operating in a same frequency band as the network entity) indicating the initiation of a UWB ranging session between the UWB-enabled UE and another UWB device. For example, the UWB-enabled UE may be configured to communicate using both UWB and cellular technologies. In some aspects, a network entity is triggered to perform interference mitigation process (es) based on determining a location of a UWB-enabled UE (e.g., operating in a same frequency band as the network entity) is within a threshold distance of another UWB device engaged in a UWB ranging session. In some aspects, a network entity is triggered to perform interference mitigation process(es) based on determining a location of a UWB-enabled UE is within an area where UWB ranging sessions frequently occur (and in some cases, within the area during a specific time when UWB ranging sessions frequently occur).

Performance of interference mitigation process(es) may help to reduce interference in a frequency band used for a UWB ranging session and cellular communication, thereby reducing UWB packet loss and improving the reliability of UWB communication. Further, reducing interference in the frequency band may help to avoid adversely affecting sensitive UWB devices communicating in the frequency band.

Introduction to Wireless Communications Networks

The techniques and methods described herein may be used for various wireless communications networks. While aspects may be described herein using terminology commonly associated with 3G, 4G, 5G, and/or 6G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell.

Figure 2:
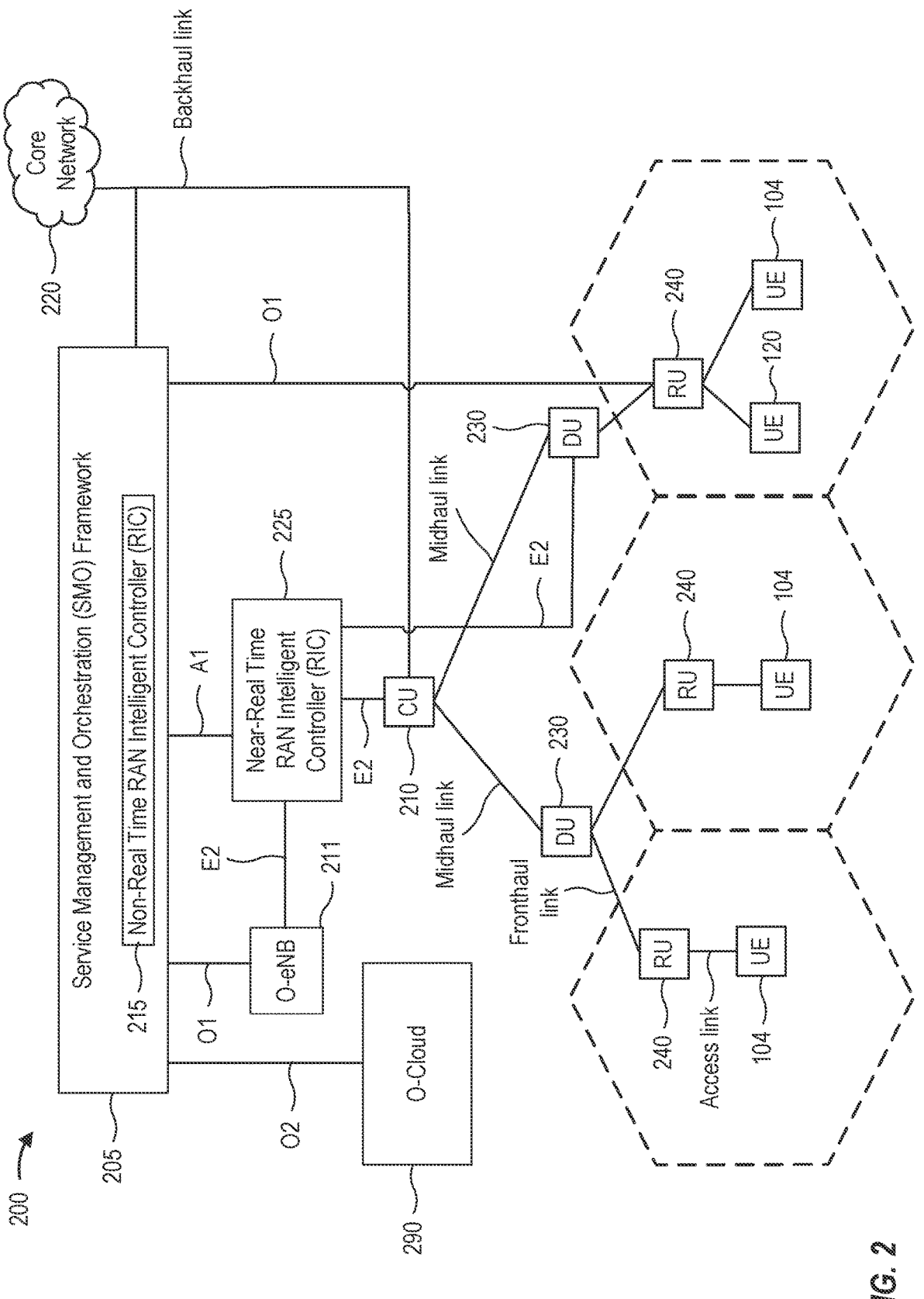
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-52,600 MHZ, which is sometimes referred to (interchangeably) as a "millimeter wave" ("mmW" or "mm Wave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
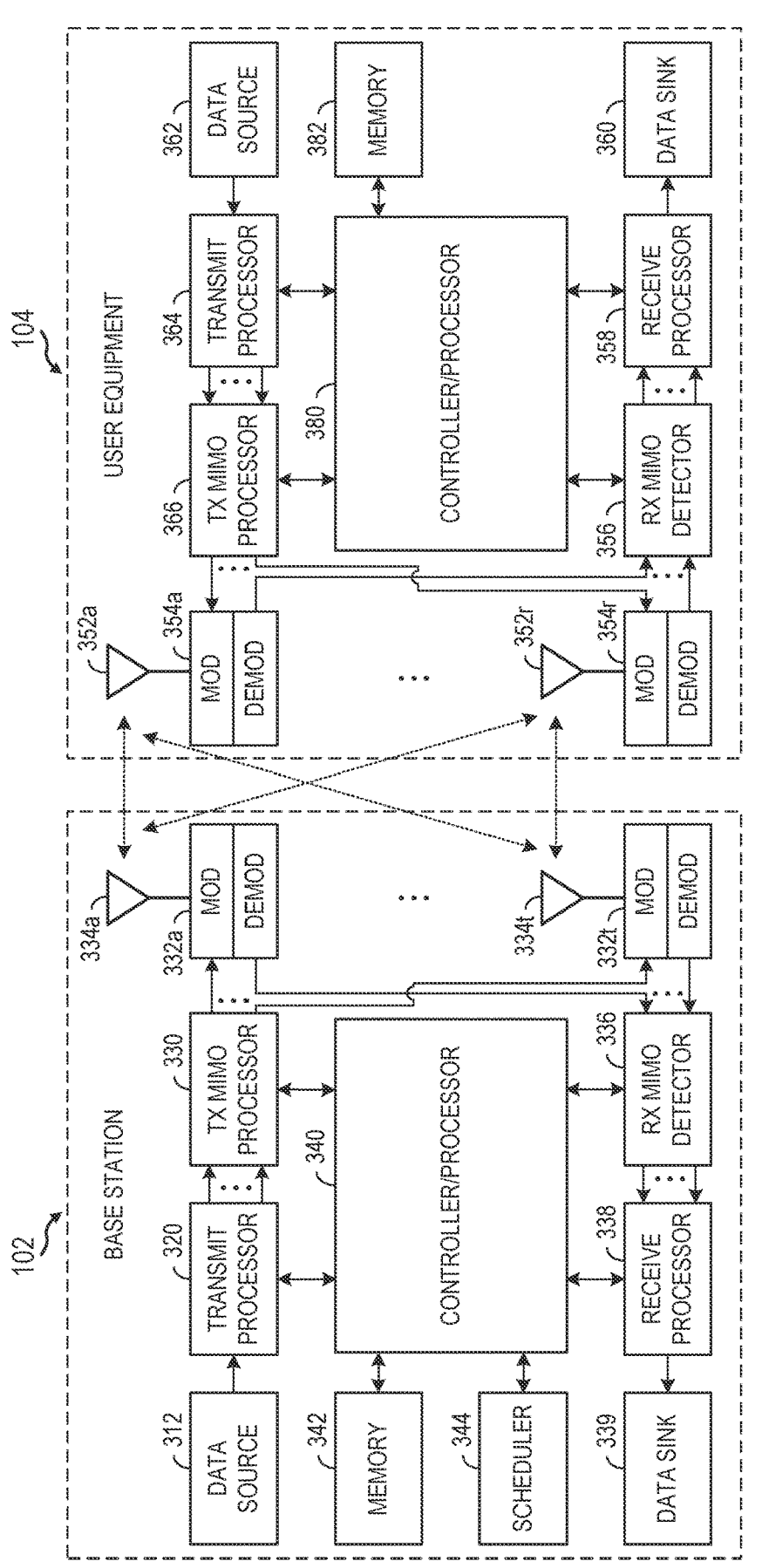
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
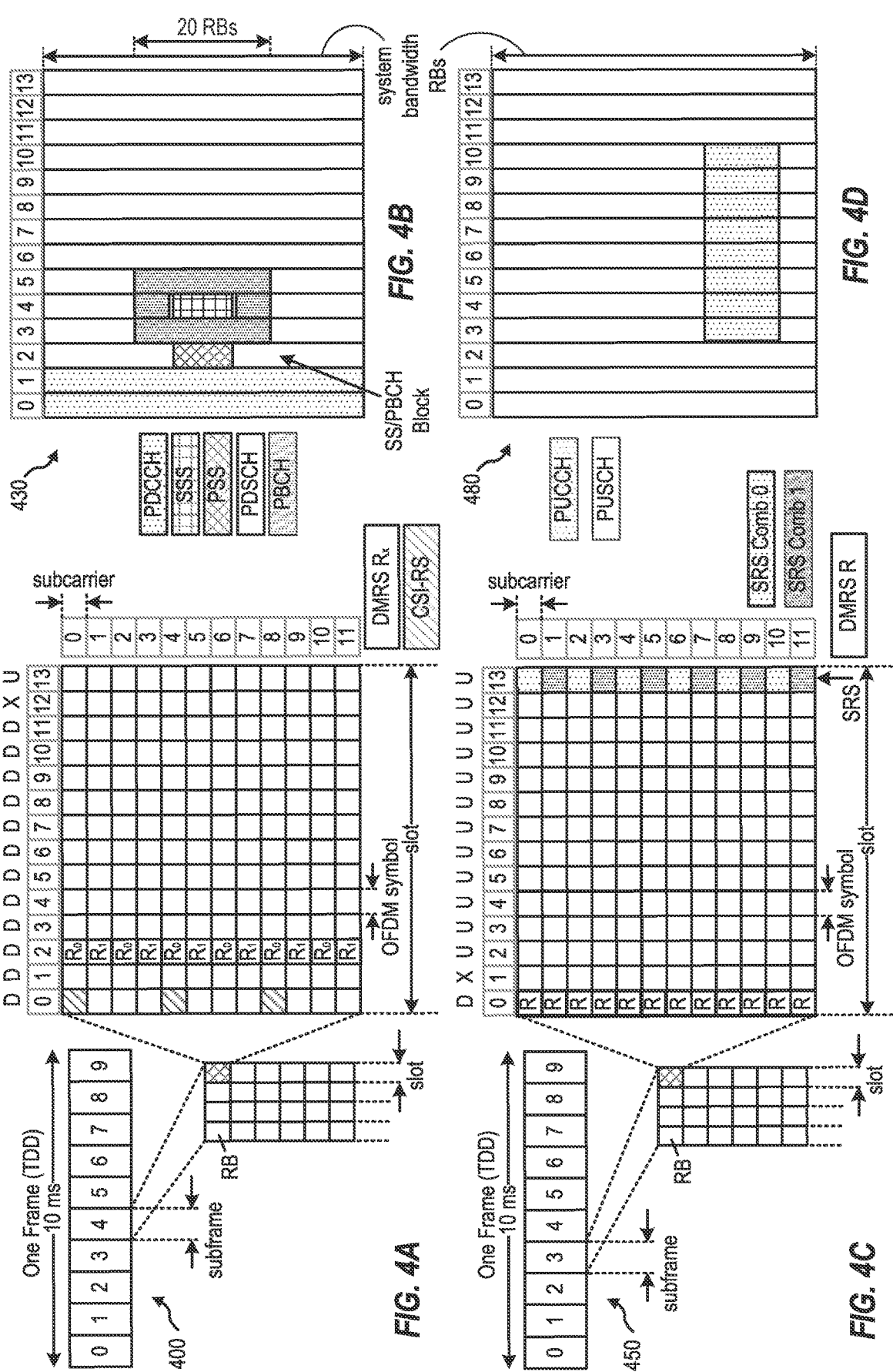
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $24 \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to UWB

UWB is a short-range, wireless communication protocol that—like Bluetooth and Wi-Fi—uses radio waves. Compared to Bluetooth and WiFi, however, UWB operates in higher frequency bands and uses a wider bandwidth (500 MHz or greater) (e.g., as the name "ultra wide" suggests). These special characteristics of UWB allow UWB to measure distance and to determine position much more accurately than other technologies, providing the basis for building more secure applications.

A UWB transmitter works by sending billions of pulses across the wide spectrum frequency. A corresponding receiver of such pulses, translates these pulses into data by listening for a familiar pulse sequence sent by the transmitter. Pulses may be sent to the receiver about one every two nanoseconds, which helps UWB achieve its real-time accuracy. In particular, these "pulse-based" radio waves are used to measure location by precisely timing how long it takes a radio pulse to travel between two different devices.

For example, when a mobile UWB-enabled device, such as a smartphone, a smartwatch, a smart key, and/or the like, is near another UWB device (e.g., mobile or fixed), the devices start "ranging" (also referred to herein as performing a "UWB ranging session"). The ranging is done by performing Time of Flight (ToF) measurements between the devices. The TOF is calculated by measuring the roundtrip time of challenge/response packets. Depending on the type of the application, either the mobile UWB-enabled device or the other UWB device calculates the precise location of the other device.

The real-time accuracy of UWB measurements means a UWB-enabled system may determine, with a very high degree of certainty, the precise location of a device and whether it's stationary or moving toward or away from a device performing the measurement. For example, a UWB-enabled system may be able to sense if a mobile UWB-enabled device is moving toward a locked door, as well as determine whether the UWB-enabled device is on the inside or the outside of the doorway, to determine if the lock should remain closed or open when the mobile UWB-enabled device reaches a certain point (e.g., a threshold distance from the locked door).

Example UWB Applications

In some cases, UWB technology is used for access control, particularly for vehicle, commercial building, and/or residential home entry systems, to name a few.

For example, in the automobile industry, digital key technology (e.g., remote access technology) is used to provide a user with the ability to unlock/lock and turn on/off their vehicles from their mobile devices, such as via an application downloaded on the mobile device. With respect to unlocking and locking vehicles, some vehicles will automatically lock and/or unlock when the user's digital key is determined to be within a threshold distance of the vehicle, while other digital keys require a user to lock and/or unlock the car manually using the affiliated application (e.g., while within the threshold distance).

Digital keys may use a combination of UWB, Bluetooth or Bluetooth Low Energy (BLE), and/or near-filed communication (NFC) to enable a user's mobile device to "communicate" with the user's vehicle (e.g., more specifically, a UWB device installed inside the car). For example, a user's mobile device may use Bluetooth coarse location estimation to determine whether the device is within a threshold distance of the user's vehicle. Bluetooth coarse location estimation may rely on signal strength (e.g., received signal strength indicator (RSSI)) to estimate an approximate location (as opposed to an exact location) of the mobile device in relation to the vehicle. When the mobile device determines to be within the threshold distance from the vehicle, the mobile device may initiate a UWB ranging session with a UWB device of the vehicle. For example, UWB secure ranging techniques may be used to send pulses of radio energy between the mobile device and the UWB device, and further perform ToF measurements between the devices. In some cases, strong encryption is used to help ensure that the distance measurements cannot be hacked by car thieves and/or the distance can be established quickly, precisely, and securely. UWB secure ranging may consume very little power, while allowing for precise measurements. Further, unlike many other distance measurement technologies, UWB may work in adverse environmental conditions, including, for example, fog, smoke, and/or rain.

Beyond digital key applications, UWB ranging may also be used with smart-tags to allow owners to find lost items, not only providing angular direction and/or distance, but also, in some cases, azimuth and/or elevation. Additionally, UWB ranging may enable secure, tap-free mobile transactions. For example, a user with a mobile device may approach a register to purchase an item, and payment for the item may be automatic without the user needing to pull out their mobile device to complete the purchase.

It should be noted that the above-described applications for UWB technology are only example applications, and many other UWB applications, not listed above, currently exist.

Aspects Related to the UWB Spectrum

UWB technology operates in regulated unlicensed spectrum. In particular, UWB technology as applied in digital key applications, for example, does not require dedicated spectrum. Instead, UWB technology coexists on a noninterference/non-protection basis in unlicensed spectrum used by incumbent spectrum users, such as, satellite systems, scientific applications, and/or radar systems.

Figure 5:
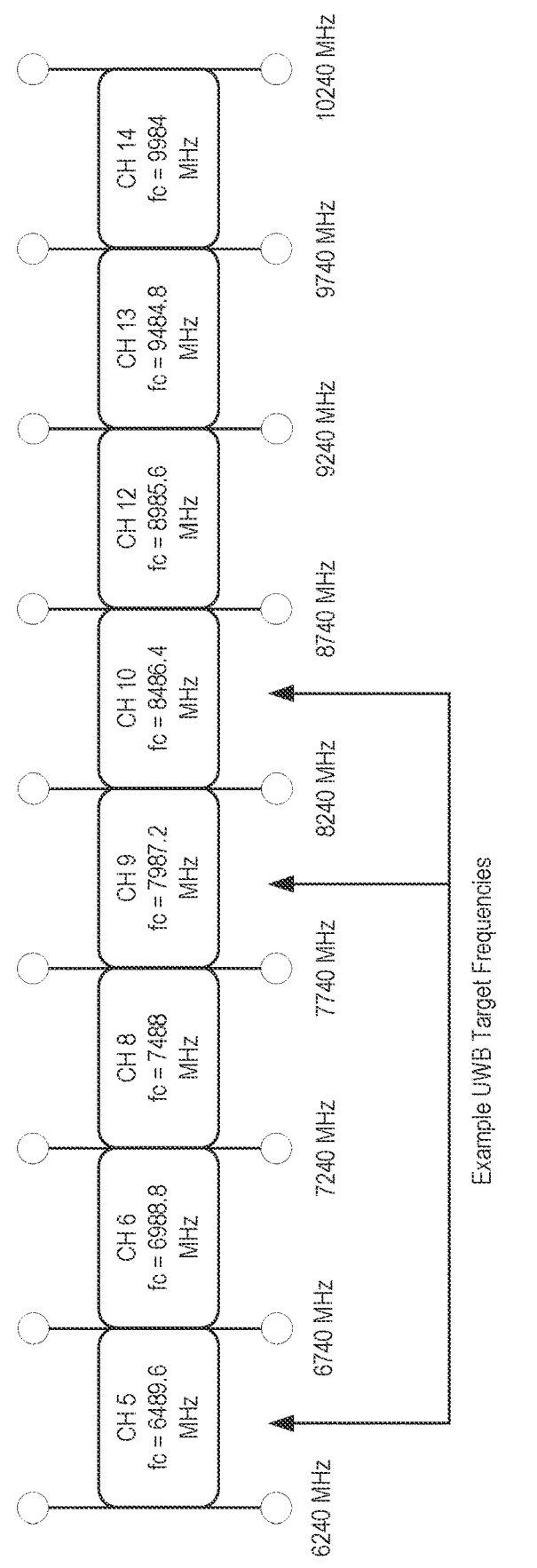
FIG. 5 depicts the ultra-wideband spectrum separated into various ultra wideband channels.

Spectrum used for UWB applications is divided into various UWB channels, such as of at least 500 MHz wide. FIG. 5 depicts the UWB spectrum 500 separated into various UWB channels with their corresponding bandwidths. As shown, UWB channel 5 (e.g., 6,240 MHz-6,740 MHz), UWB channel 9 (e.g., 7,740 MHz-8,240 MHz), and UWB channel 10 (e.g., 8,240 MHz-8,740 MHz) are the three main targeted UWB channels for UWB applications (e.g., such as digital key applications). In some cases, UWB digital key applications targets UWB channel 9 usage with UWB channel 5 as an alternate channel. Being able to operate UWB on multiple channels adds capacity because UWB devices are able to use different channels to co-exist without interfering with each other. Further, some channels are easier to work in than others.

Unfortunately for UWB applications, other wireless devices and standards may also use similar frequencies as those allocated to UWB channels 5, 9, and 10. As such, UWB devices may be susceptible to interference from higher power transmitters located close to the UWB devices and that are using the same frequency range for communication. These higher power transmitters may include International Mobile Telecommunications (IMT) devices, such as 4G, 5G, and/or 6G devices, and/or devices configured to use Wi-Fi for communication.

For example, UWB channel 5 is in the center of the 6-GHz Wi-Fi spectrum, which means there is a chance of interference between the two radios, especially in very dense Wi-Fi environments with high Wi-Fi throughput. In such cases, resulting radio interference may cause UWB packet loss, in some cases, lengthening the time for performing a ranging session on an intermittent basis (e.g., based on various simulations and empirical data).

As another example, in the IMT spectrum, frequencies between 7,125 MHZ and 15,000 MHz (e.g., the frequency range 3 (FR3) band) and between 6,425 MHz to 7,125 MHz are targeted for IMT wireless communications. IMT targeted frequencies between 6,425 MHz and 7,125 MHz partially overlap with frequencies of UWB channel 5, while IMT targeted frequencies between 7,125, MHz and 15,000 MHz overlap with both UWB channel 9 and UWB channel 10. Such overlapping indicates that UWB devices operating in such frequencies may be susceptible to interference from IMT devices.

Figure 6:
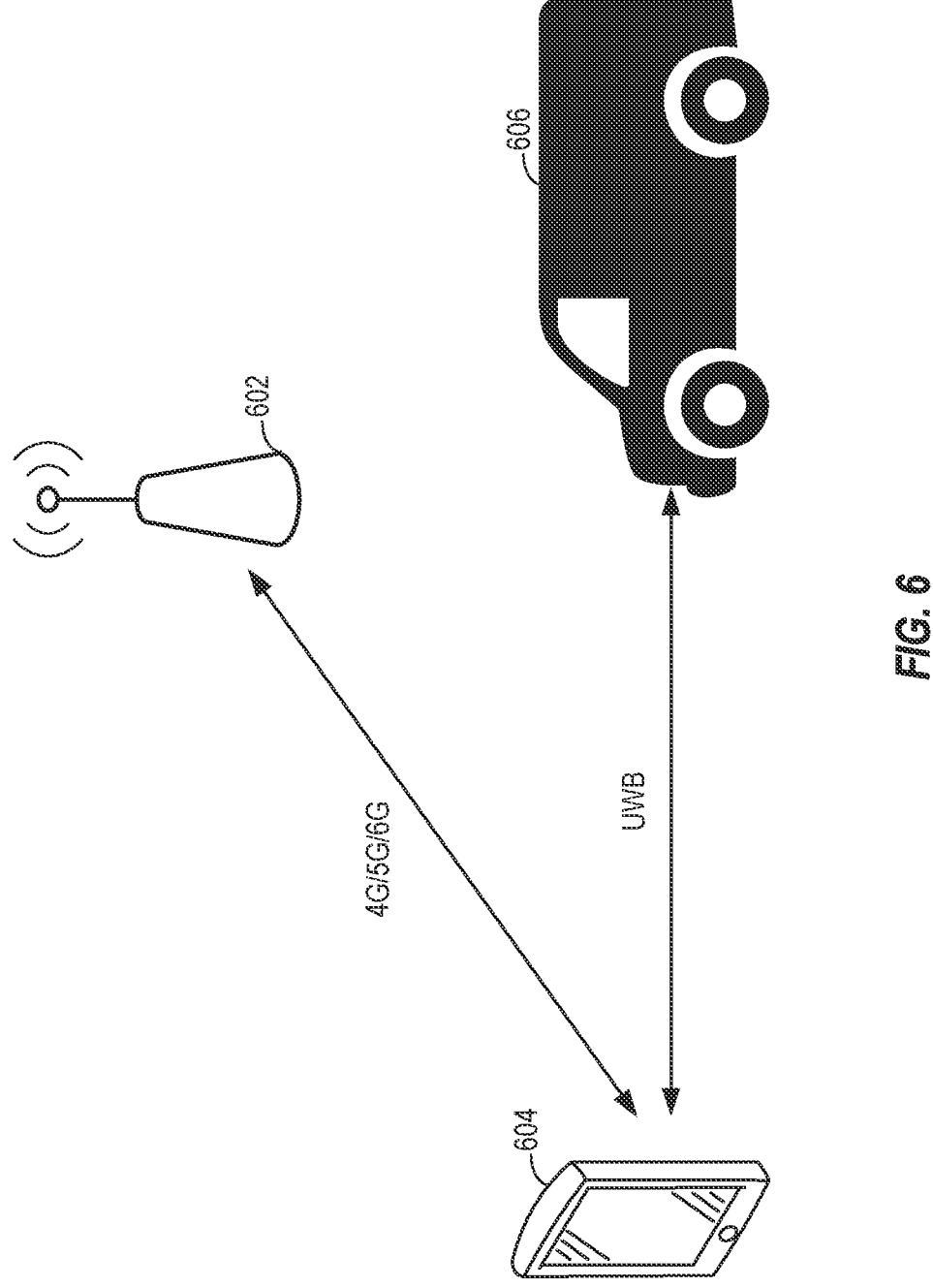
FIG. 6 depicts the susceptibility of ultra-wideband devices to interference from higher power transmitters.

For example, FIG. 6 depicts the susceptibility of UWB-enabled devices to interference from higher power wideband communication transmitters. As shown, a UWB-enabled UE 604 (e.g., such as UE 104 of FIGS. 1 and 3) may communicate with both a network entity 602 (e.g., such as BS 102 of FIGS. 1 and 3, or a disaggregated base station as discussed with respect to FIG. 2) and a vehicle configured for UWB communication (e.g., a UWB device 606) at a same time. More specifically, UE 604 may communicate with UWB device 606 to carry out a UWB ranging session with UWB device 606 when UE 604 is determined to be within a threshold distance of UWB device 606 (e.g., via Bluetooth coarse location estimation). For this example, the UWB ranging session between UE 604 and UWB device 606 may occur on frequencies of UWB channel 9 (e.g., between 7,740 MHz-8,240 MHz). UE 604 may also wirelessly communicate with network entity 602 using frequencies between 7,740 MHZ-8,240 MHz. Accordingly, interference with UWB communication between UE 604 and UWB device 606 may be inevitable.

Figure 7:
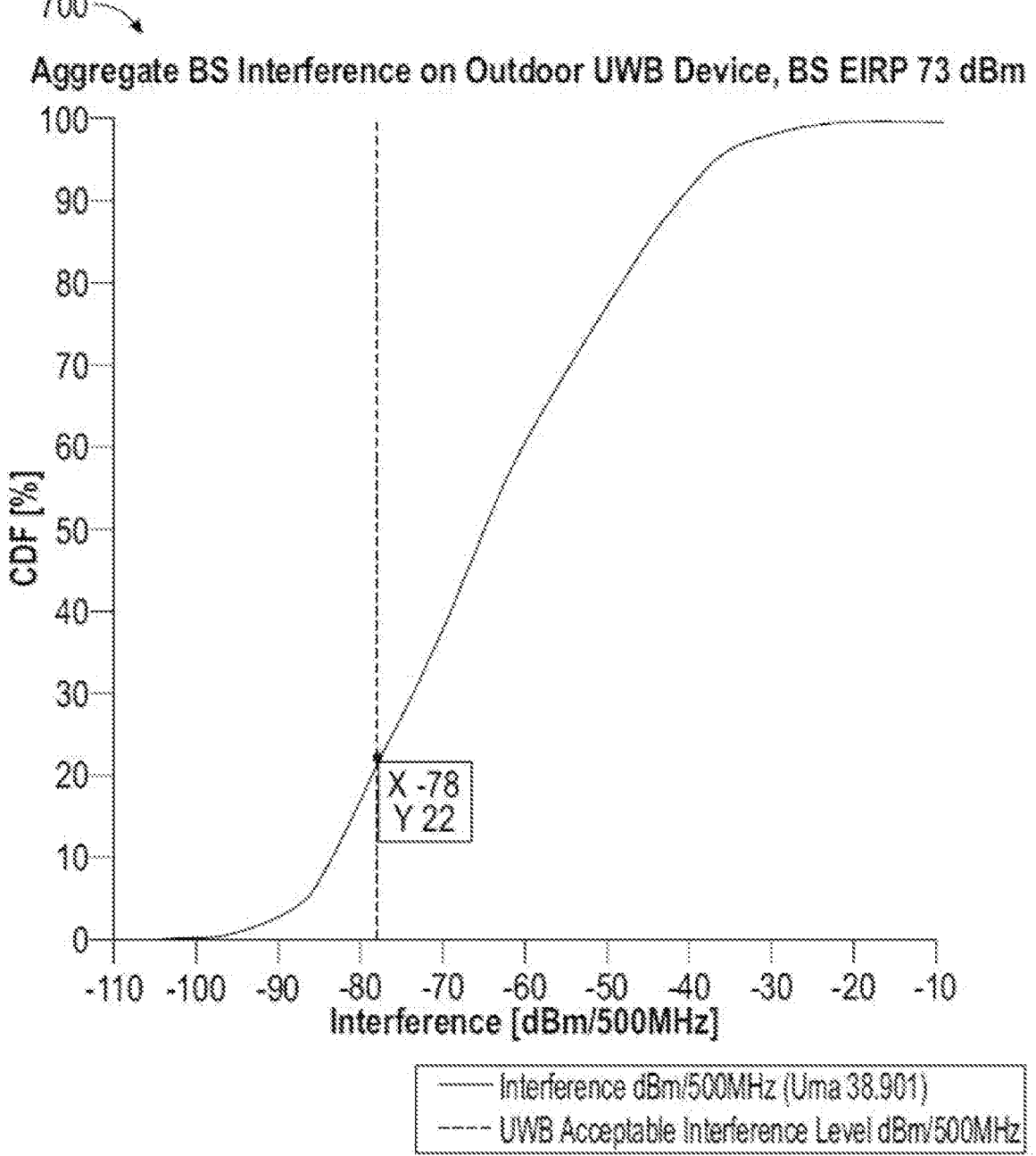
FIG. 7 depicts example interference to multiple outdoor ultra-wideband devices from high power transmitters.

FIG. 7 is a graph 700 depicting example interference to multiple outdoor UWB devices caused by transmission from a network entity, such as network entity 602 illustrated in FIG. 6. The x-axis of graph 700 corresponds to a percentage of UWB devices experiencing interference. The y-axis of graph 700 corresponds to percentages of cumulative distribution function (CDF) of the signal to noise plus interference ratio (SNIR) perceived by multiple UWB devices. As shown, for this example, 78% of UWB devices may experience interference higher than a pre-determined acceptable amount of interference.

Interference caused by the coexistence of wireless telecommunication devices and UWB devices operating in a same frequency band is a technically challenging problem given such interference may result in lost data, inefficient ranging sessions between UWB devices, and/or adversely impact sensitive UWB devices.

Aspects Related to Co-Channel Coexistence of UWB Devices and Wireless Telecommunication Devices In order to overcome technical problems associated with the coexistence of wireless telecommunication devices (e.g., 4G, 5G, and/or 6G devices) and UWB devices operating in a same frequency band, aspects described herein propose various techniques for mitigating channel interference. For example, one or more network entities (e.g., example wireless telecommunication device(s)) may perform one or more interference mitigation processes to reduce interference in the shared frequency band used by one or more UWB devices for performing UWB ranging session(s).

In some aspects, a network entity is triggered to perform such interference mitigation process(es) based on receiving signaling from a UWB-enabled device (e.g., operating in a same frequency band as the network entity) indicating that a UWB ranging session between the UWB-enabled device and another UWB-enabled device has started. This scenario is depicted in FIGS. 8A and 8B.

Figure 8A:
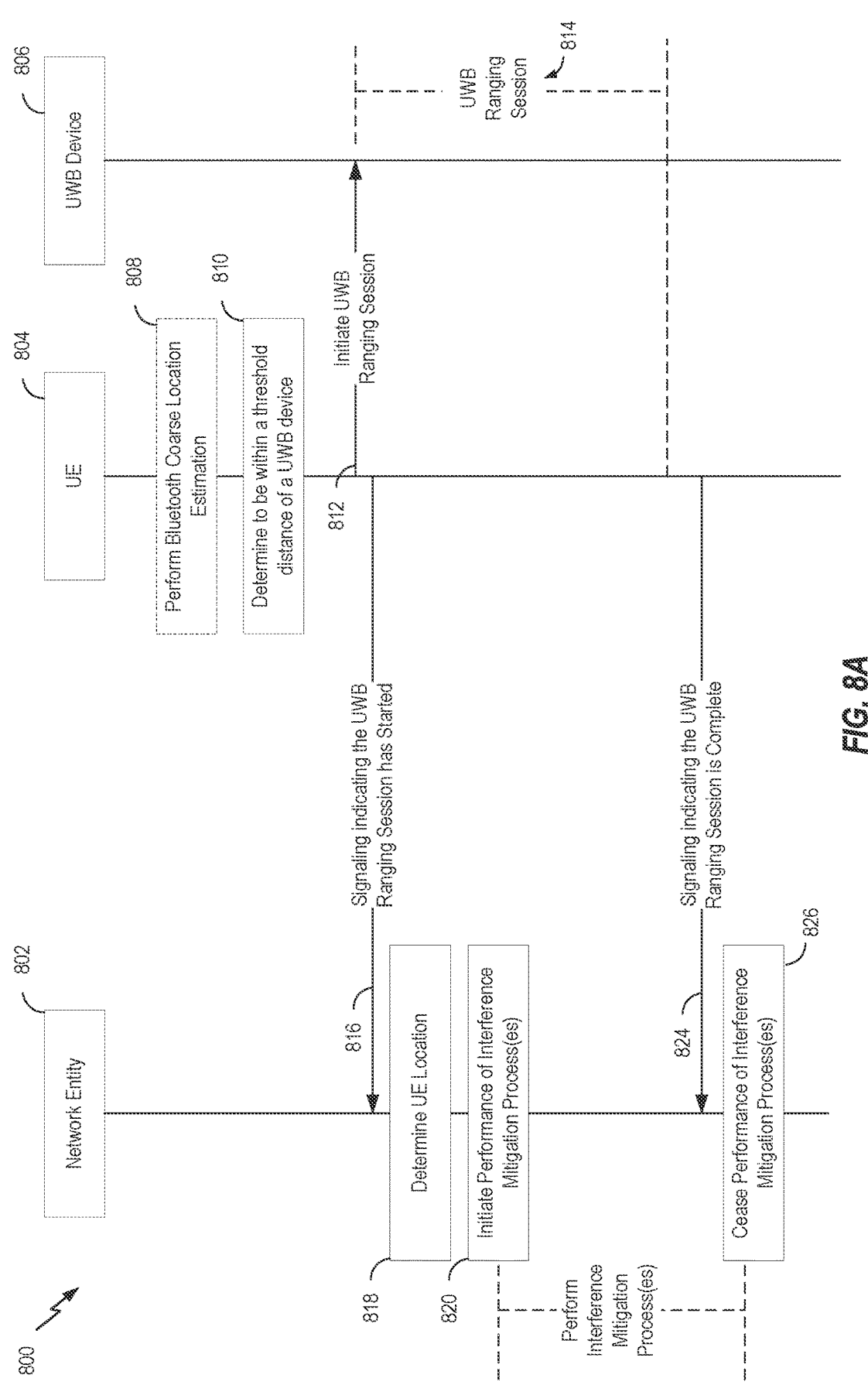
FIGS. 8A and 8B depict process flows for communications in a network between a network entity, a UE (e.g., an ultra-wideband-enabled UE), and an ultra-wideband device.
Figure 8B:
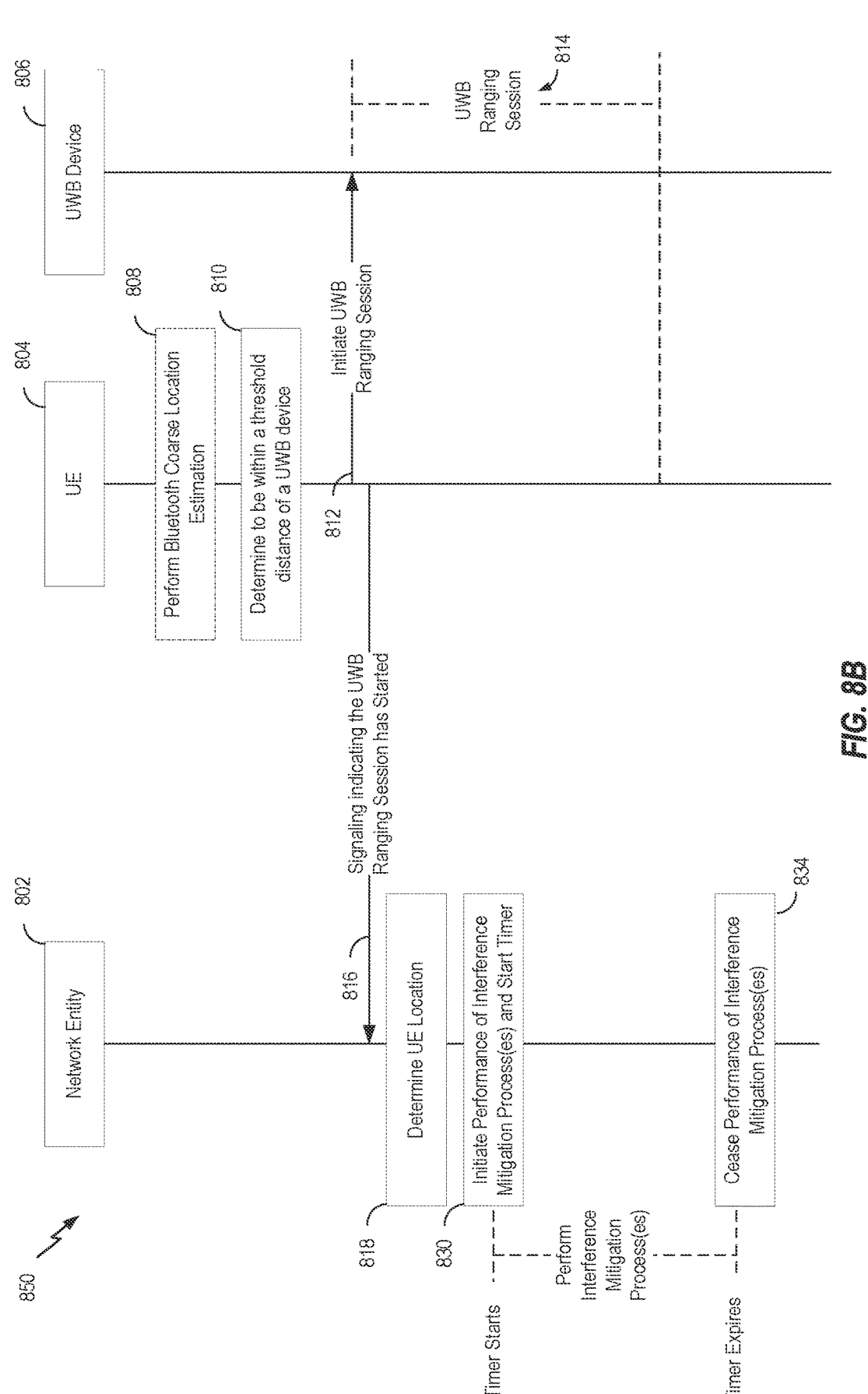

In particular, FIGS. 8A and 8B depict process flows 800, 850 for communications in a network between a network entity 802, a UE 804 (e.g., a UWB-enabled UE), and a UWB device 806. In some aspects, the network entity 802 is an example of the BS 102 depicted and described with respect to FIGS. 1 and 3 or a disaggregated base station depicted and described with respect to FIG. 2. Similarly, the UE 804 may be an example of UE 104 depicted and described with respect to FIGS. 1 and 3. However, in other aspects, UE 104 may be another type of wireless communications device and BS 102 may be another type of network entity or network node, such as those described herein.

In some aspects, UWB device 806 is implemented within a vehicle, and UE 804 and UWB device 806 are configured to carry out a UWB ranging session to allow a user of UE 804 (who is also the owner of the vehicle) to unlock/lock the vehicle. In other words, the UWB communication between UE 804 and UWB device 806 may be an example of using UWB technology for a digital key application. UWB communication between UE 804 and UWB device 806 (e.g., to allow digital key locking and/or unlocking) may begin when UE 804 is determined to be within a threshold distance of UWB device 806.

In some other aspects, UWB device 806 is implemented at a commercial building or a residential home to enable digital key control access at these locations. In some other aspects, UWB device 806 is implemented at a register to allow for automatic payment of one or more items for sale, via a UWB application enabled on UE 104, when UE 104 is within a threshold distance of UWB device 806. It should be noted that the described locations where UWB device 806 is implemented are only examples, and many other locations and/or use cases, not listed above, may be considered to allow for various UWB applications with UWB device 806.

As shown in FIGS. 8A and 8B, process flows 800, 850 begin, at step 810, with UE 804 determining to be within a threshold distance (e.g., within 2 meters (m) or less) of a UWB device, for example, UWB device 806 (e.g., distance from UE 804 to UWB device 806 is ≤2 m). In some aspects, UE 804 makes this determination based on performing Bluetooth coarse location estimation at step 808. As described above, Bluetooth coarse location estimation may be used by UE 804 to estimate an approximate location of UE 804 in relation to UWB device 806. Because UWB communication is a short-range wireless communication protocol, UE 804 needs to first determine that UE 804 is within the threshold distance (e.g., a short distance) from UWB device 806.

Based on determining that UE 804 is within the threshold distance of UWB device 806, process flows 800, 850 proceed, at step 812, with UE 804 initiating a UWB ranging session 814 between UE 804 and UWB device 806. As described above, UWB ranging session 814 may involve transmitting pulses of radio energy between UE 804 and UWB device 806, and further performing ToF measurements between UE 804 and UWB device 806. A UWB channel used for UWB ranging session 814 between UE 804 and UWB device 806 may be UWB channel 5 (e.g., corresponding to a frequency band of 6,240 MHz-6,740 MHz), UWB channel 9 (e.g., corresponding to a frequency band of 7,740 MHz-8,240 MHz), or UWB channel 10 (e.g., corresponding to a frequency band of 8,240 MHz-8,740 MHz).

Frequencies of the UWB channel used for UWB ranging session 814 may also be used for 4G, 5G, 6G, and/or other cellular communication between UE 804 and network entity 802. As an illustrative example, UWB ranging session 814 may occur in frequencies between 7,740 MHZ-8,240 MHz (e.g., corresponding to UWB channel 9), and network entity 802 may communicate with UE 804 in the same frequency range.

Process flows 800, 850 then proceed, at step 816, with UE 804 transmitting signaling (referred to herein as "first signaling") indicating the initiation of UWB ranging session 814 between UE 804 and UWB device 806. For example, UE 804 may transmit this signaling based on determining that UE 804 is within the threshold distance of UWB device 806 and/or based on initiating UWB ranging session 814. In some aspects, UE 804 transmits the signaling immediately after starting UWB ranging session 814 with UWB device 806.

UE 804 may transmit the signaling at step 816 to inform network entity 802 that UE 804 is also engaged (or is about to be engaged) in UWB ranging session 814 with UWB device 806. Informing network entity 802 about UWB ranging session 814 may trigger network entity 802 to initiate performance of one or more interference mitigation processes to reduce interference in the UWB channel used for UWB ranging session 814.

For example, in response to receiving the signaling at step 816, at step 818, network entity 802 determines a location of UE 804. In some aspects, network entity 802 determines the location of UE 804 based on receiving signaling indicating UE 804's location. In some aspects, this signaling is transmitted to network entity 802 by UE 804. Network entity 802 may use UE 804's location information to perform one or more interference mitigation processes. Accordingly, at step 820, network entity 802 initiates performance of such process(es). Performance of one or more interference mitigation processes may be used to reduce interference in the UWB channel used for UWB ranging session 814 between UE 804 and UWB device 806.

Further, in some aspects, one or more interference mitigation processes may be performed to reduce interference in UWB channel(s) adjacent to the UWB channel used for UWB ranging session 814 between UE 804 and UWB device 806. For example, where UWB channel 9 is used for UWB ranging session 814, network entity 802 may perform one or more interference mitigation process(es) in frequency ranges corresponding to UWB channel 8 and/or UWB channel 10. In particular, signals transmitted in adjacent channel(s) may cause interference in the UWB channel used for UWB ranging session 814. For example, filters (e.g., band filters) may not attenuate all frequencies outside a desired frequency range; thus, some energy from transmission(s) in channel(s) adjacent to the UWB channel used for UWB ranging session 814 may fall within the UWB channel.

Various interference mitigation processes, described in detail below, may be performed by network entity 802 to reduce the channel interference.

For example, in some aspects, the interference mitigation process(es) performed by network entity 802 include configuring transmission gap(s) between a plurality of transmissions scheduled for transmission by network entity 802 to UE 804. A transmission gap refers to a time period during which network entity 802 refrains from transmitting to UE 804. For example, one gap may be configured between each scheduled transmission, every two scheduled transmissions, every three scheduled transmissions, etc. In other words, the gaps may be configured periodically between the transmissions for a particular periodicity. In some aspects, the gaps may be configured at random. In some aspects where there are multiple gaps configured, the gaps are configured with a same duration. In some aspects where there are multiple gaps configured, less than all the gaps are configured with a same duration.

In some aspects, network entity 802 determines to configure or more transmission gaps in response to receiving signaling from UE 804 requesting that network entity 802 configure such transmission gap(s). In some aspects, in the received request, UE 804 indicates a number of gaps, a duration of one or more gaps, and/or a periodicity of gaps that are requested to be configured by network entity 802.

Configuring gaps between transmissions scheduled to be transmitted from network entity 802 to UE 804 may help to reduce the probability of interference in the frequency band also being used for UWB ranging session 814 between UE 804 and UWB device 806. In particular, as network entity 802 does not transmit signals to UE 804, such as in the direction of UE 804, there is reduced interference as compared to if such signals are transmitted to UE 804.

In some aspects, the interference mitigation process(es) performed by network entity 802 include reducing traffic between network entity 802 and UE 804. Reducing traffic between network entity 802 and UE 804 may help to decrease the probability of transmissions between network entity 802 and UE 804 colliding with UWB signaling (e.g., pulses) of UWB ranging session 814. In some aspects, network entity 802 reduces the traffic by limiting an average number of transmissions with UE 804 (e.g., in the frequency range where UWB ranging session 814 is occurring) over a period of time.

In some aspects, the interference mitigation process(es) performed by network entity 802 include changing a frequency range (e.g., changing a channel) used for communication with UE 804. For example, prior to initiating performance of interference mitigation process(es) at step 820, network entity 802 may receive an indication of the UWB channel used for UWB ranging session 814. Network entity 802 may then determine to communicate with UE 804 over a frequency range different than the frequency range associated with the UWB channel used for UWB ranging session 814. For example, in cases where network entity 802 receives an indication from UE 804 indicating that UWB channel 9 (e.g., 7,740 MHz-8,240 MHz) is being used for UWB ranging session, network entity 802 may determine to communicate with UE 804 over frequencies associated with other UWB channels other than UWB channel 9 (e.g., communicate with UE 804 over frequencies that are not between 7,740 MHz and 8,240 MHz).

In some aspects, the interference mitigation process(es) performed by network entity 802 include changing a band used for communication with UE 804. For example, prior to initiating performance of interference mitigation process(es) at step 820, network entity 802 may receive an indication of a band used for UWB ranging session 814. Network entity 802 may then determine to communicate with UE 804 over a band different than the band used for UWB ranging session 814 (e.g., indicated by UE 804).

In some aspects, the interference mitigation process(es) performed by network entity 802 include network entity 802 using resource blocks (RBs) of a UWB channel (e.g., associated with a frequency range) that do not overlap (e.g., in frequency) with RBs of the UWB channel used for UWB ranging session 814.

In some aspects, the interference mitigation process(es) performed by network entity 802 include network entity 802 reducing gain at network entity 802 for communication with UE 804. For example, network entity 802 may reduce an amount of amplifier gain used to transmit signals to UE 804, thereby reducing a power with which signals are sent to UE 804. Accordingly, signals from network entity 802 may be received at UE 804 with reduced power, therefore leading to reduced interference from such signals.

In some aspects, the interference mitigation process(es) performed by network entity 802 include network entity 802 shaping an antenna beam of network entity 802 and limiting energy transmitted towards the determined location of UE 804 (e.g., in the frequency range associated with the UWB channel used for UWB ranging session 814). In particular, this may create null transmissions in the direction of UE 804.

It is noted that the above-described interference mitigation processes that may be performed by network entity 802 are only example processes, and many other processes, not listed above, may be considered to help reduce channel interference in the UWB channel used for UWB ranging session 814.

In some aspects, as shown in FIG. 8A, network entity 802 performs interference mitigation process(es) until network entity 802 receives, at step 824, signaling (e.g., referred to herein as "second signaling") indicating UWB ranging session 814 is complete. For example, UE 804 may be configured to transmit, to network entity 802, signaling indicating the completion of UWB ranging session 814 after UWB ranging session 814 has completed. In response to receiving the signaling at step 824, network entity 802 may cease performance of the interference mitigation process(es) (e.g., at step 826).

In some other aspects, as shown in FIG. 8B, when initiating performance of interference mitigation process(es), at step 830, network entity 802 may start a timer. In some cases, the timer is a pre-defined timer configured to run for a pre-defined amount of time. In some cases, UE 804 signals, to network entity 802, the length of the timer (e.g., start to expiration of the timer). The length of the timer provided by UE 804 may be based on the expected duration of UWB ranging session 814. At the expiration of the timer, network entity 802 may determine to cease performance of the interference mitigation process(es) (e.g., at step 834). As such, in this case, network entity 802 may not receive any additional signaling indicating the completion of UWB ranging session 814.

In some aspects, a network entity (e.g., such as BS 102 depicted and described with respect to FIGS. 1 and 3 or a disaggregated base station depicted and described with respect to FIG. 2) may determine to initiate performance of one or more interference mitigation processes for a UE that is not within a first threshold distance of a UWB device, but is instead within a second threshold distance of another UE that is within the first threshold distance of a UWB device. For example, due to proximity of the two UEs, transmissions to the UE not within the first threshold distance of the UWB device may, in some cases, cause interference to the UE that is within the threshold distance of the UWB device (e.g., when using a channel to perform a UWB ranging session). As such, in some cases, it may be beneficial to also initiate performance of one or more interference mitigation processes for the UE that is not within a first threshold distance of a UWB device, but is close to another UE that is.

Figure 9:
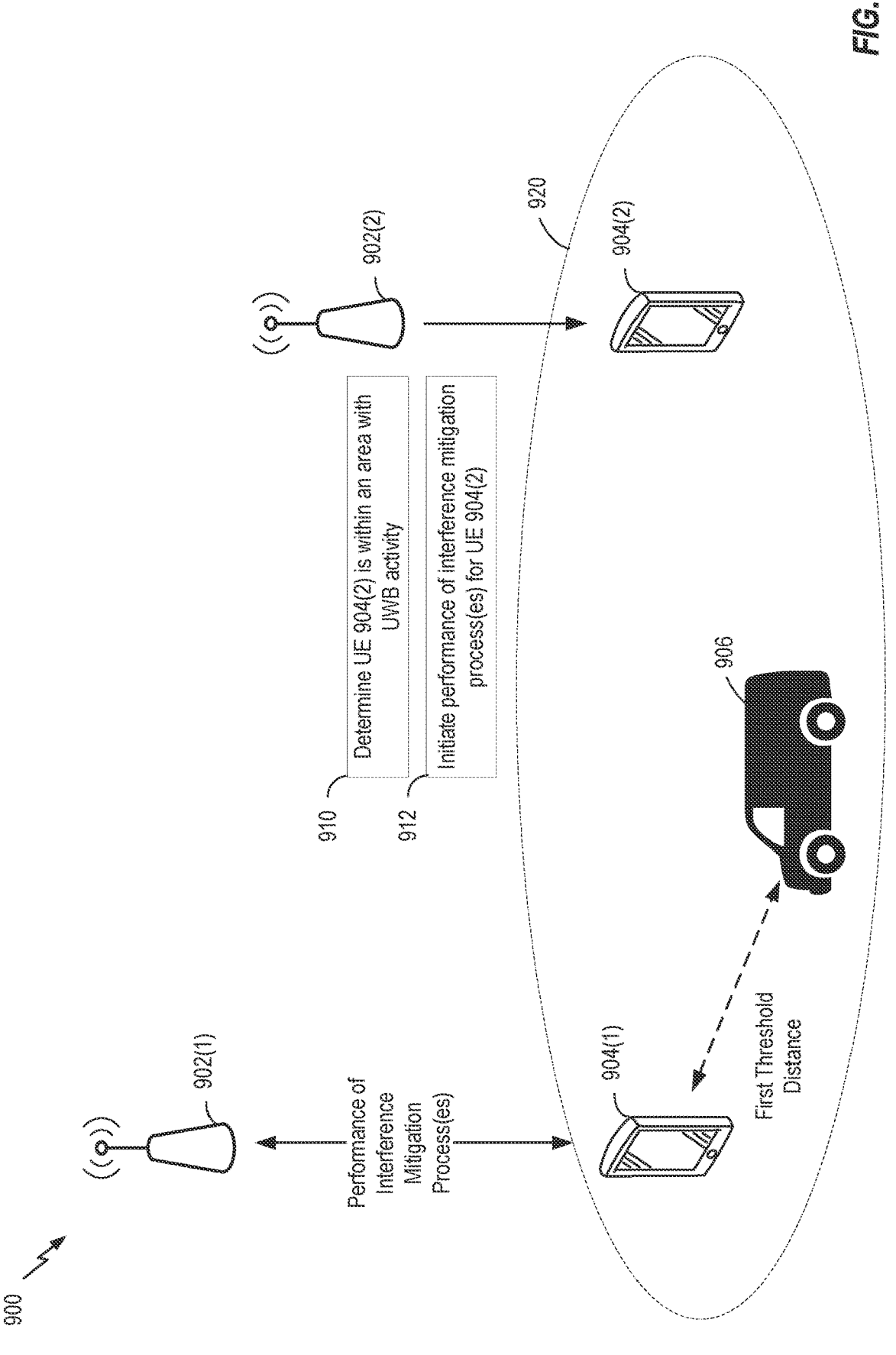
FIG. 9 depicts an example scenario where a network entity initiates performance of interference mitigation process(es) for a UE not within a first threshold distance of an ultra-wideband device.

FIG. 9 depicts an example 900 where a second network entity 902(2) initiates performance of interference mitigation process(es) for a second UE 904(2) not within a first threshold distance of a UWB device 906 (e.g., implemented in a vehicle).

For example, as shown in FIG. 9, a first UE 904(1) (e.g., an example of UE 104 depicted and described with respect to FIGS. 1 and 3) may (1) determine that first UE 904(1) is within a first threshold distance of a UWB device 906, (2)

initiate a UWB ranging session with UWB device 906, and (3) transmit signaling to a first network entity 902(1) (e.g., an BS 102 depicted and described with respect to FIGS. 1 and 3 or a disaggregated base station depicted and described with respect to FIG. 2) (e.g., similar to steps 810, 812, and 816 in FIGS. 8A and 8B). In response to receiving the signaling, first network entity 902(1) may perform one or more interference mitigation processes for first UE 904(1) (e.g., to reduce channel interference for the UWB ranging session between first UE 904(1) and UWB device 906, similar to steps 820 and 830 in FIGS. 8A and 8B, respectively).

Further, in example 900, a second network entity 902(2) may learn about UWB activity occurring (e.g., the UWB ranging session occurring involving first UE 904(1)) within an area 920 where first UE 904(1) is located. Additionally, second network entity 902(2) may determine, at 910, that a second UE 904(2) is within the same area 920 where the UWB activity is occurring (e.g., second UE 904(2) and first UE 904(1) are close in proximity given they are both located within the same area 920). Subsequent to determining that second UE 904(2) is within area 920, second UE 904(2) may determine, at 912, to initiate performance of one or more interference mitigation processes for second UE 904(2).

In some aspects, one or more network entities may learn about areas/locations (e.g., referred to herein as "dense areas") where a large number of UWB ranging sessions occur between UEs and UWB devices (e.g., a number of UWB ranging sessions exceed a first threshold frequency, where the first threshold frequency is a threshold rate of UWB ranging sessions occurring within a time period). For example, the one or more network entities may determine that a number of UWB ranging sessions exceeding the first threshold frequency occur within a particular parking lot, parking garage, or at a particular store. In some aspects, this information is used to create a heat map that is used to indicate the frequency of UWB ranging sessions at different locations.

Further, in some aspects, the one or more network entities may learn about different times when UWB ranging sessions at these dense areas exceed a second threshold frequency. In some cases, the first threshold and the second threshold are the same threshold. In some cases, the first threshold and the second threshold are different thresholds. For example, for the parking garage, the one or more network entities may determine that between the hours of 7 am and 9 am and 4 pm and 6 pm, the number of UWB ranging sessions is above the second threshold frequency (e.g., due to use of digital key applications for unlocking/locking cars where this parking lot is an employee parking lot). This information may also be added to the created heat map.

In some aspects, the one or more network entities may determine to initiate the performance of one or more interference mitigation processes using the heat map or based on a location. For example, if a UWB-enabled UE is determined to be within an area (e.g., a dense area where a number of UWB ranging sessions is known to exceed the first threshold frequency), then a network entity may initiate the performance of one or more interference mitigation processes for the UWB-enabled UE. As another example, if a UWB-enabled UE is determined to be within an area at a certain time (e.g., at 8 am) (e.g. when a number of UWB ranging sessions is known to exceed the second threshold frequency), then a network entity may initiate the performance of one or more interference mitigation processes for the UWB-enabled UE. For example, by using the heat map, the network entity may be able to infer at which time of the day, or week, or month, or year UWB ranging activity is higher and in what locations.

In some aspects, information contained in a generated heat map may be used to train machine learning algorithms to optimize traffic to help reduce channel interference for UWB applications.

Example Operations

FIG. 10 shows a method 1000 for wireless communications by an apparatus, such as BS 102 of FIGS. 1 and 3, or a disaggregated base station as discussed with respect to FIG. 2.

Method 1000 begins at step 1005 with receiving, from a first UE, first signaling indicating an initiation of a first ultra-wideband ranging session between the first UE and an ultra-wideband device.

Method 1000 then proceeds to step 1010 with determining a location of the first UE after receiving the first signaling.

Method 1000 then proceeds to step 1015 with performing one or more first interference mitigation processes configured to reduce channel interference in a first ultra-wideband channel used for the first ultra-wideband ranging session based on, at least, the location of the first UE.

In certain aspects, method 1000 further includes receiving, from the first UE, second signaling indicating that the first ultra-wideband ranging session is complete.

In certain aspects, method 1000 further includes ceasing performing the one or more first interference mitigation processes based on receiving the second signaling.

In certain aspects, method 1000 further includes starting a timer at or after a beginning of the one or more first interference mitigation processes.

In certain aspects, method 1000 further includes, at an expiration of the timer, ceasing performing the one or more first interference mitigation processes.

In certain aspects, step 1015 further includes configuring one or more first gaps between a first plurality of transmissions scheduled for transmission by the apparatus to the first UE.

In certain aspects, method 1000 further includes receiving, from the first UE, a request to configure the one or more first gaps.

In certain aspects, step 1015 further includes configuring the one or more first gaps based on the request.

In certain aspects, the one or more first gaps are configured with a same duration.

In certain aspects, the one or more first gaps are configured periodically between the first plurality of transmissions.

In certain aspects, step 1015 further includes limiting an average number of transmissions with the first UE in a frequency range associated with the first ultra-wideband channel over a period of time.

In certain aspects, method 1000 further includes receiving, from the first UE, prior to performance of the one or more first interference mitigation processes, an indication of the first ultra-wideband channel used for the first ultra-wideband ranging session.

In certain aspects, step 1015 further includes communicating with the first UE over a first frequency range different than a second frequency range associated with the first ultra-wideband channel used for the first ultra-wideband ranging session.

In certain aspects, step 1015 further includes communicating with the first UE using first resource blocks different than second resource blocks of the first ultra-wideband channel used for the first ultra-wideband ranging session.

In certain aspects, method 1000 further includes receiving, from the first UE, prior to performing the one or more first interference mitigation processes, an indication of a band used for the first ultra-wideband ranging session.

In certain aspects, step 1015 further includes reducing gain at the apparatus for communication with the first UE.

In certain aspects, step 1015 further includes shaping an antenna beam of the apparatus.

In certain aspects, step 1015 further includes limiting energy transmitted towards a location of the first UE in a frequency range associated with the first ultra-wideband channel.

In certain aspects, the apparatus is serving the first UE, a second UE, and a third UE; and the method 1000 further includes: determining a location of the second UE is within a second threshold distance from a location of the third UE; determining a network entity serving the third UE is performing one or more second interference mitigation processes configured to reduce channel interference in a second ultra-wideband channel for a second ultra-wideband ranging session involving the third UE; and performing one or more third interference mitigation processes for the second UE based on, at least, the location of the second UE.

In certain aspects, method 1000 further includes determining a second UE is located within a second threshold distance of an area associated with a number of ultra-wideband ranging sessions exceeding a threshold frequency.

In certain aspects, method 1000 further includes performing one or more second interference mitigation processes for the second UE based on the second UE being located within the second threshold distance of the area.

In certain aspects, method 1000 further includes determining the area associated with the number of ultra-wideband ranging sessions exceeding the threshold frequency based on information from one or more other apparatuses about a plurality of ultra-wideband ranging sessions.

In certain aspects, method 1000 further includes determining a second UE is located within a second threshold distance of an area associated with a number of ultra-wideband ranging sessions exceeding a threshold frequency during a first time period.

In certain aspects, method 1000 further includes determining the second UE is located within the second threshold distance of the area at a time within the first time period.

In certain aspects, method 1000 further includes performing one or more second interference mitigation processes for the second UE based on the second UE being located within the second threshold distance of the area and at the time within the first time period.

In certain aspects, method 1000 further includes determining the area associated with the number of ultra-wideband ranging sessions exceeding the threshold frequency during the first time period based on information from one or more other apparatuses about a plurality of ultra-wideband ranging sessions.

In certain aspects, method 1000 further includes performing the one or more first interference mitigation processes to reduce channel interference in a second ultra-wideband channel adjacent to the first ultra-wideband channel used for the first ultra-wideband ranging session.

Figure 12:
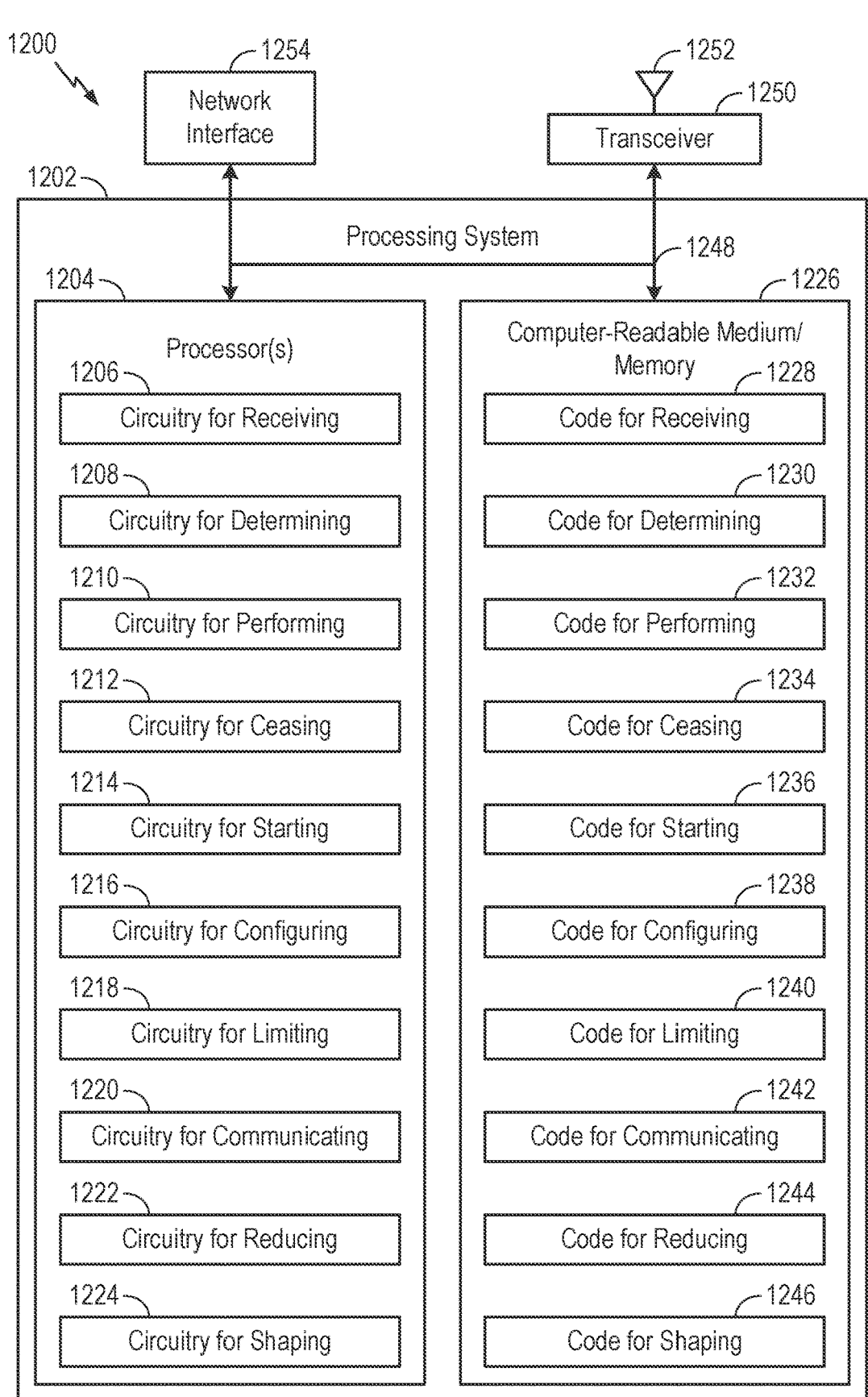
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 shows a method 1100 for wireless communications by an apparatus, such as UE 104 of FIGS. 1 and 3.

Method 1100 begins at step 1105 with determining the apparatus is within a threshold distance of an ultra-wideband device.

Method 1100 then proceeds to step 1110 with initiating an ultra-wideband ranging session between the apparatus and the ultra-wideband device based on the determination that the apparatus is within the threshold distance.

Method 1100 then proceeds to step 1115 with transmitting, to a network entity, first signaling indicating the ultra-wideband ranging session has started.

Method 1100 then proceeds to step 1120 with, after concluding the ultra-wideband ranging session, transmitting, to the network entity, second signaling indicating that the ultra-wideband ranging session is complete.

In certain aspects, method 1100 further includes determining the apparatus is within the threshold distance of the ultra-wideband device via Bluetooth coarse location estimation.

In certain aspects, method 1100 further includes transmitting, to the network entity, a request to configure one or more first gaps between a first plurality of transmissions scheduled for transmission by the network entity to the apparatus.

In certain aspects, method 1100 further includes transmitting, to the network entity, the request to configure the one or more first gaps via the first signaling.

In certain aspects, method 1100 further includes transmitting, to the network entity, an indication of an ultra-wideband channel used for the ultra-wideband ranging session.

In certain aspects, method 1100 further includes transmitting, to the network entity, the indication of the ultra-wideband channel used for the ultra-wideband ranging session via the first signaling.

In certain aspects, method 1100 further includes communicating, during the ultra-wideband ranging session, with the network entity over a first frequency range different than a second frequency range associated with an ultra-wideband channel used for the ultra-wideband ranging session.

In certain aspects, method 1100 further includes communicating, during the ultra-wideband ranging session, with the network entity using first resource blocks different than second resource blocks of an ultra-wideband channel used for the ultra-wideband ranging session.

In certain aspects, method 1100 further includes transmitting, to the network entity, an indication of a band used for the ultra-wideband ranging session.

In certain aspects, method 1100 further includes transmitting, to the network entity, the indication of a band used for the ultra-wideband ranging session via the first signaling.

Figure 13:
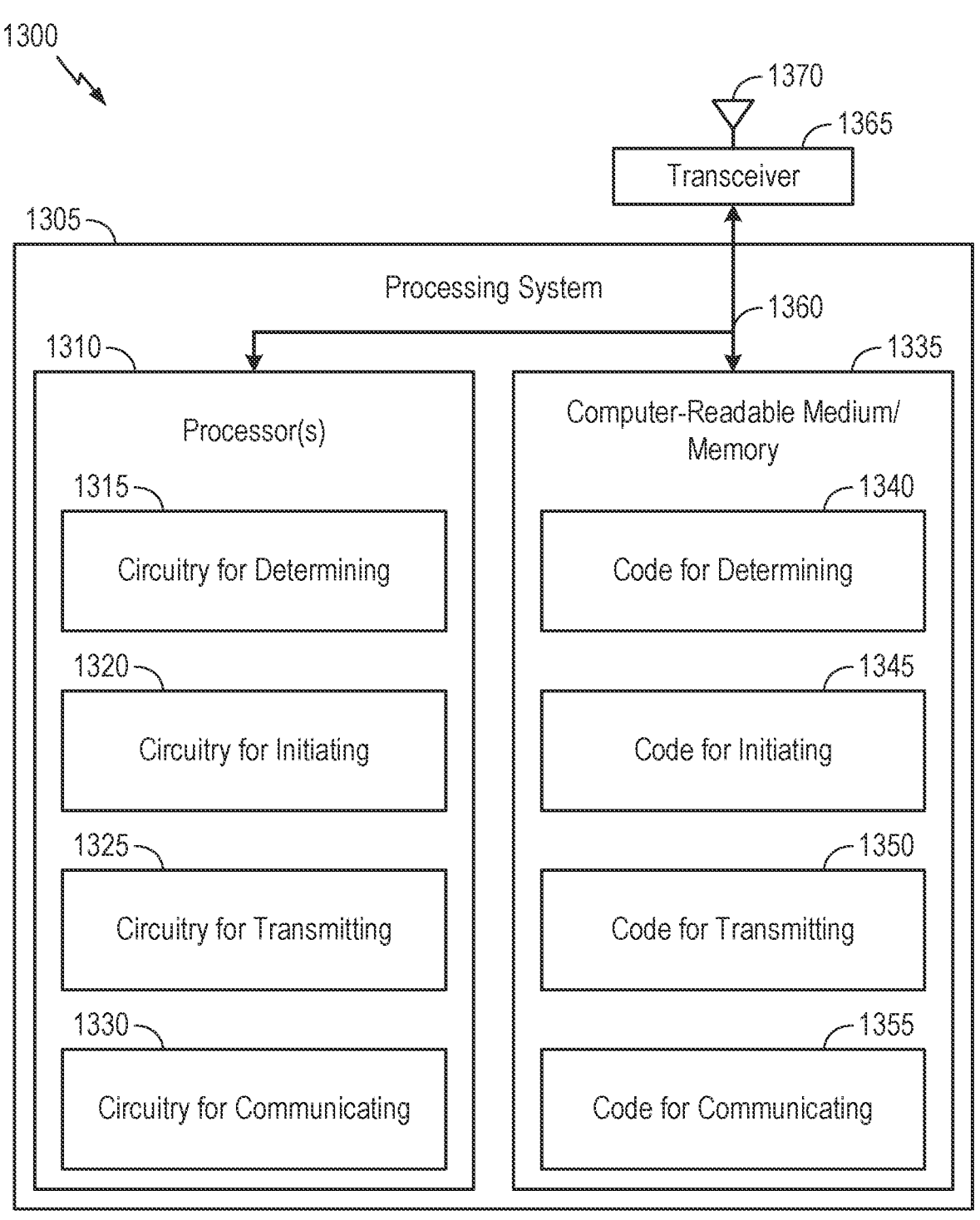
FIG. 13 depicts aspects of an example communications device.

In certain aspects, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1202 coupled to a transceiver 1250 (e.g., a transmitter and/or a receiver) and/or a network interface 1254. The transceiver 1250 is configured to transmit and receive signals for the communications device 1200 via an antenna 1252, such as the various signals as described herein. The network interface 1254 is configured to obtain and send signals for the communications device 1200 via communications link(s), such as a backhaul link, midhaul link, and/or fronthaul link as described herein, such as with respect to FIG. 2. The processing system 1202 may be configured to perform processing functions for the communications device 1200, including processing signals received and/or to be transmitted by the communications device 1200.

The processing system 1202 includes one or more processors 1204. In various aspects, one or more processors 1204 may be representative of one or more of receive processor 338, transmit processor 320, TX MIMO processor 330, and/or controller/processor 340, as described with respect to FIG. 3. The one or more processors 1204 are coupled to a computer-readable medium/memory 1226 via a bus 1248. In certain aspects, the computer-readable medium/memory 1226 is configured to store instructions (e.g., computer-executable code) that when executed by the one or more processors 1204, enable and cause the one or more processors 1204 to perform the method 1000 described with respect to FIG. 10, or any aspect related to it, including any additional steps or sub-steps described in relation to FIG. 10. Note that reference to a processor of communications device 1200 performing a function may include one or more processors of communications device 1200 performing that function, such as in a distributed fashion.

In the depicted example, the computer-readable medium/memory 1226 stores code for receiving 1228, code for determining 1230, code for performing 1232, code for ceasing 1234, code for starting 1236, code for configuring 1238, code for limiting 1240, code for communicating 1242, code for reducing 1244, and code for shaping 1246. Processing of the code 1228-1246 may enable and cause the communications device 1200 to perform the method 1000 described with respect to FIG. 10, or any aspect related to it.

The one or more processors 1204 include circuitry configured to implement (e.g., execute) the code stored in the computer-readable medium/memory 1226, including circuitry for receiving 1206, circuitry for determining 1208, circuitry for performing 1210, circuitry for ceasing 1212, circuitry for starting 1214, circuitry for configuring 1216, circuitry for limiting 1218, circuitry for communicating 1220, circuitry for reducing 1222, and circuitry for shaping 1224. Processing with circuitry 1206-1224 may enable and cause the communications device 1200 to perform the method 1000 described with respect to FIG. 10, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1250 and/or antenna 1252 of the communications device 1200 in FIG. 12, and/or one or more processors 1204 of the communications device 1200 in FIG. 12. Means for communicating, receiving or obtaining may include the transceivers 332, antenna(s) 334, receive processor 338, and/or controller/processor 340 of the BS 102 illustrated in FIG. 3, transceiver

1250 and/or antenna 1252 of the communications device 1200 in FIG. 12, and/or one or more processors 1204 of the communications device 1200 in FIG. 12.

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to a transceiver 1365 (e.g., a transmitter and/or a receiver). The transceiver 1365 is configured to transmit and receive signals for the communications device 1300 via an antenna 1370, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1335 via a bus 1360. In certain aspects, the computer-readable medium/memory 1335 is configured to store instructions (e.g., computer-executable code) that when executed by the one or more processors 1310, enable and cause the one or more processors 1310 to perform the method 1100 described with respect to FIG. 11, or any aspect related to it, including any additional steps or sub-steps described in relation to FIG. 11. Note that reference to a processor performing a function of communications device 1300 may include one or more processors performing that function of communications device 1300, such as in a distributed fashion.

In the depicted example, computer-readable medium/memory 1335 stores code for determining 1340, code for initiating 1345, code for transmitting 1350, and code for communicating 1355. Processing of the code 1340-1355 may enable and cause the communications device 1300 to perform the method 1100 described with respect to FIG. 11, or any aspect related to it.

The one or more processors 1310 include circuitry configured to implement (e.g., execute) the code stored in the computer-readable medium/memory 1335, including circuitry for determining 1315, circuitry for initiating 1320, circuitry for transmitting 1325, and circuitry for communicating 1330. Processing with circuitry 1315-1330 may enable and cause the communications device 1300 to perform the method 1100 described with respect to FIG. 11, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1365 and/or antenna 1370 of the communications device 1300 in FIG. 13, and/or one or more processors 1310 of the communications device 1300 in FIG. 13. Means for communicating, receiving or obtaining may include the transceivers 354, antenna(s) 352, receive processor 358, and/or controller/processor 380 of the UE 104 illustrated in FIG. 3, transceiver 1365 and/or antenna 1370 of the communications device 1300 in FIG. 13, and/or one or more processors 1310 of the communications device 1300 in FIG. 13.

Example Clauses

Implementation examples are described in the following numbered clauses:

Clause 1: A method for wireless communications by an apparatus, comprising: receiving, from a first UE, first signaling indicating an initiation of a first ultra-wideband ranging session between the first UE and an ultra-wideband device; determining a location of the first UE after receiving the first signaling; and performing one or more first interference mitigation processes configured to reduce channel interference in a first ultra-wideband channel used for the first ultra-wideband ranging session based on, at least, the location of the first UE.

Clause 2: The method of Clause 1, further comprising: receiving, from the first UE, second signaling indicating that the first ultra-wideband ranging session is complete; and ceasing performing the one or more first interference mitigation processes based on receiving the second signaling.

Clause 3: The method of any one of Clauses 1-2, further comprising: starting a timer at or after a beginning of the one or more first interference mitigation processes; and at an expiration of the timer, ceasing performing the one or more first interference mitigation processes.

Clause 4: The method of any one of Clauses 1-3, wherein performing the one or more first interference mitigation processes comprises configuring one or more first gaps between a first plurality of transmissions scheduled for transmission by the apparatus to the first UE.

Clause 5: The method of Clause 4, further comprising: receiving, from the first UE, a request to configure the one or more first gaps; and configuring the one or more first gaps based on the request.

Clause 6: The method of any one of Clauses 4-5, wherein the one or more first gaps are configured with a same duration.

Clause 7: The method of any one of Clauses 4-5, wherein the one or more first gaps are configured periodically between the first plurality of transmissions.

Clause 8: The method of any one of Clauses 1-7, wherein performing the one or more first interference mitigation processes comprises limiting an average number of transmissions with the first UE in a frequency range associated with the first ultra-wideband channel over a period of time.

Clause 9: The method of any one of Clauses 1-8, further comprising receiving, from the first UE, prior to performance of the one or more first interference mitigation processes, an indication of the first ultra-wideband channel used for the first ultra-wideband ranging session.

Clause 10: The method of Clause 9, wherein performing the one or more first interference mitigation processes comprises communicating with the first UE over a first frequency range different than a second frequency range associated with the first ultra-wideband channel used for the first ultra-wideband ranging session.

Clause 11: The method of Clause 9, wherein performing the one or more first interference mitigation processes comprises communicating with the first UE using first resource blocks different than second resource blocks of the first ultra-wideband channel used for the first ultra-wideband ranging session.

Clause 12: The method of any one of Clauses 1-11, further comprising receiving, from the first UE, prior to performing the one or more first interference mitigation processes, an indication of a band used for the first ultra-wideband ranging session.

Clause 13: The method of any one of Clauses 1-12, wherein performing the one or more first interference mitigation processes comprises reducing gain at the apparatus for communication with the first UE.

Clause 14: The method of any one of Clauses 1-13, wherein performing the one or more first interference mitigation processes comprises: shaping an antenna beam of the apparatus; and limiting energy transmitted towards a location of the first UE in a frequency range associated with the first ultra-wideband channel.

Clause 15: The method of any one of Clauses 1-14, wherein: the apparatus is serving the first UE, a second UE, and a third UE; and the method further comprises: determining a location of the second UE is within an area including the third UE; determining a network entity serving the third UE is performing one or more second interference mitigation processes configured to reduce channel interference in a second ultra-wideband channel for a second ultra-wideband ranging session involving the third UE; and performing one or more third interference mitigation processes for the second UE based on, at least, the location of the second UE being within the area including the third UE.

Clause 16: The method of any one of Clauses 1-15, further comprising: determining a second UE is located within a second threshold distance of an area associated with a number of ultra-wideband ranging sessions exceeding a threshold frequency; and performing one or more second interference mitigation processes for the second UE based on the second UE being located within the second threshold distance of the area.

Clause 17: The method of Clause 16, further comprising determining the area associated with the number of ultra-wideband ranging sessions exceeding the threshold frequency based on information from one or more other apparatuses about a plurality of ultra-wideband ranging sessions.

Clause 18: The method of any one of Clauses 1-17, further comprising: determining a second UE is located within a second threshold distance of an area associated with a number of ultra-wideband ranging sessions exceeding a threshold frequency during a first time period; determining the second UE is located within the second threshold distance of the area at a time within the first time period; and performing one or more second interference mitigation processes for the second UE based on the second UE being located within the second threshold distance of the area and at the time within the first time period.

Clause 19: The method of Clause 18, further comprising determining the area associated with the number of ultra-wideband ranging sessions exceeding the threshold frequency during the first time period based on information from one or more other apparatuses about a plurality of ultra-wideband ranging sessions.

Clause 20: The method of any one of Clauses 1-19, further comprising performing the one or more first interference mitigation processes to reduce channel interference in a second ultra-wideband channel adjacent to the first ultra-wideband channel used for the first ultra-wideband ranging session.

Clause 21: A method for wireless communications by an apparatus, comprising: determining the apparatus is within a threshold distance of an ultra-wideband device; initiating an ultra-wideband ranging session between the apparatus and the ultra-wideband device based on the determination that the apparatus is within the threshold distance; transmitting, to a network entity, first signaling indicating the ultra-wideband ranging session has started; and after concluding the ultra-wideband ranging session, transmitting, to the network entity, second signaling indicating that the ultra-wideband ranging session is complete.

Clause 22: The method of Clause 21, further comprising determining the apparatus is within the threshold distance of the ultra-wideband device via Bluetooth coarse location estimation.

Clause 23: The method of any one of Clauses 21-22, further comprising transmitting, to the network entity, a request to configure one or more first gaps between a first plurality of transmissions scheduled for transmission by the network entity to the apparatus.

Clause 24: The method of Clause 23, further comprising transmitting, to the network entity, the request to configure the one or more first gaps via the first signaling.

Clause 25: The method of any one of Clauses 21-24, further comprising transmitting, to the network entity, an indication of an ultra-wideband channel used for the ultra-wideband ranging session.

Clause 26: The method of Clause 25, further comprising transmitting, to the network entity, the indication of the ultra-wideband channel used for the ultra-wideband ranging session via the first signaling.

Clause 27: The method of any one of Clauses 21-26, further comprising communicating, during the ultra-wideband ranging session, with the network entity over a first frequency range different than a second frequency range associated with an ultra-wideband channel used for the ultra-wideband ranging session.

Clause 28: The method of any one of Clauses 21-27, further comprising communicating, during the ultra-wideband ranging session, with the network entity using first resource blocks different than second resource blocks of an ultra-wideband channel used for the ultra-wideband ranging session.

Clause 29: The method of any one of Clauses 21-28, further comprising transmitting, to the network entity, an indication of a band used for the ultra-wideband ranging session.

Clause 30: The method of Clause 29, further comprising transmitting, to the network entity, the indication of a band used for the ultra-wideband ranging session via the first signaling.

Clause 31: One or more apparatuses, comprising: one or more memories comprising executable instructions; and one or more processors configured to execute the executable instructions and cause the one or more apparatuses to perform a method in accordance with any one of clauses 1-30.

Clause 32: One or more apparatuses, comprising means for performing a method in accordance with any one of clauses 1-30.

Clause 33: One or more non-transitory computer-readable media comprising executable instructions that, when executed by one or more processors of one or more apparatuses, cause the one or more apparatuses to perform a method in accordance with any one of clauses 1-30.

Clause 34: One or more computer program products embodied on one or more computer-readable storage media comprising code for performing a method in accordance with any one of clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus for wireless communications, comprising a processing system that includes one or more processors and one or more memories coupled with the one or more processors, the processing system configured to cause a network entity to:

receive, from a first user equipment (UE), first signaling that indicates an initiation of a first ultra-wideband ranging session between the first UE and an ultra-wideband device;

determine a location of the first UE after receipt of the first signaling;

perform one or more first interference mitigation processes configured to reduce channel interference in a first ultra-wideband channel used for the first ultra-wideband ranging session based on, at least, the location of the first UE;

determine a second UE is located within a threshold distance of an area associated with a number of ultra-wideband ranging sessions that exceed a threshold frequency; and perform one or more second interference mitigation processes for the second UE based on a location of the second UE within the threshold distance of the area.

2. The apparatus of claim 1, wherein the processing system is configured to cause the network entity to:

receive, from the first UE, second signaling that indicates that the first ultra-wideband ranging session is complete; and cease performance of the one or more first interference mitigation processes based on receipt of the second signaling.

3. The apparatus of claim 1, wherein the processing system is configured to cause the network entity to:

start a timer at or after a beginning of the one or more first interference mitigation processes; and at an expiration of the timer, cease performance of the one or more first interference mitigation processes.

4. The apparatus of claim 1, wherein to cause the network entity to perform the one or more first interference mitigation processes, the processing system is configured to cause the network entity to configure one or more first gaps between a first plurality of transmissions scheduled for transmission by the apparatus to the first UE.

5. The apparatus of claim 4, wherein the processing system is configured to cause the network entity to:

receive, from the first UE, a request to configure the one or more first gaps, and configure the one or more first gaps based on the request.

6. The apparatus of claim 4, wherein the one or more first gaps are configured with a same duration.

7. The apparatus of claim 4, wherein the one or more first gaps are configured periodically between the first plurality of transmissions.

8. The apparatus of claim 1, wherein the processing system is configured to cause the network entity to, prior to performance of the one or more first interference mitigation processes, receive, from the first UE, an indication of a band used for the first ultra-wideband ranging session.

9. The apparatus of claim 1, wherein to cause the network entity to perform the one or more first interference mitigation processes, the processing system is configured to cause the network entity to reduce gain at the apparatus for communication with the first UE.

10. The apparatus of claim 1, wherein to cause the network entity to perform the one or more first interference mitigation processes, the processing system is configured to cause the network entity to:

shape an antenna beam of the apparatus; and limit energy transmitted towards the first UE in a frequency range associated with the first ultra-wideband channel.

11. The apparatus of claim 1, wherein the processing system is configured to cause the network entity to determine the area associated with the number of ultra-wideband ranging sessions that exceed the threshold frequency based on information from one or more other apparatuses about a plurality of ultra-wideband ranging sessions.

12. The apparatus of claim 1, wherein the processing system is configured to cause the network entity to:

determine the second UE is located within the threshold distance of the area at a time within a first time period; and perform the one or more second interference mitigation processes for the second UE based on the second UE being located within the threshold distance of the area and at the time within the first time period.

13. The apparatus of claim 12, wherein the processing system is configured to cause the network entity to determine the area associated with the number of ultra-wideband ranging sessions that exceed the threshold frequency within the first time period based on information from one or more other apparatuses about a plurality of ultra-wideband ranging sessions.

14. The apparatus of claim 1, wherein the processing system is configured to cause the network entity to perform the one or more first interference mitigation processes to reduce channel interference in a second ultra-wideband channel adjacent to the first ultra-wideband channel used for the first ultra-wideband ranging session.

15. An apparatus for wireless communications, comprising a processing system that includes one or more processors and one or more memories coupled with the one or more processors, the processing system configured to cause a network entity to:

receive, from a first user equipment (UE), first signaling that indicates an initiation of a first ultra-wideband ranging session between the first UE and an ultra-wideband device;

determine a location of the first UE after receipt of the first signaling; and perform one or more first interference mitigation processes configured to reduce channel interference in a first ultra-wideband channel used for the first ultra-wideband ranging session based on, at least, the location of the first UE, wherein:

the apparatus serves the first UE and a second UE; and the processing system is configured to cause the network entity to:

determine a location of the second UE is within an area that includes a third UE;

determine a network entity that serves the third UE is involved in a performance of one or more second interference mitigation processes configured to reduce channel interference in a second ultra-wideband channel for a second ultra-wideband ranging session that involves the third UE; and perform one or more third interference mitigation processes for the second UE based on, at least, the location of the second UE within the area that includes the third UE.

16. A method for wireless communications by an apparatus, comprising:

receiving, from a first user equipment (UE), first signaling indicating an initiation of a first ultra-wideband ranging session between the first UE and an ultra-wideband device;

determining a location of the first UE after receiving the first signaling; and performing one or more first interference mitigation processes configured to reduce channel interference in a first ultra-wideband channel used for the first ultra-wideband ranging session based on, at least, the location of the first UE, wherein the method further comprises:

determining a second UE is located within a threshold distance of an area associated with a number of ultra-wideband ranging sessions that exceed a threshold frequency; and performing one or more second interference mitigation processes for the second UE based on a location of the second UE within the threshold distance of the area.

17. The method of claim 16, further comprising:

receiving, from the first UE, second signaling indicating that the first ultra-wideband ranging session is complete; and ceasing performing the one or more first interference mitigation processes based on receiving the second signaling.

18. The method of claim 16, further comprising:

starting a timer at or after a beginning of the one or more first interference mitigation processes; and at an expiration of the timer, ceasing performing the one or more first interference mitigation processes.

19. The method of claim 16, wherein performing the one or more first interference mitigation processes comprises configuring one or more first gaps between a first plurality of transmissions scheduled for transmission by the apparatus to the first UE.

20. The method of claim 19, further comprising:

receiving, from the first UE, a request to configure the one or more first gaps, and configuring the one or more first gaps based on the request.

21. The method of claim 19, wherein the one or more first gaps are configured with a same duration.

22. The method of claim 19, wherein the one or more first gaps are configured periodically between the first plurality of transmissions.

23. The method of claim 16, wherein the method comprises, prior to performance of the one or more first interference mitigation processes, receiving, from the first UE, an indication of a band used for the first ultra-wideband ranging session.

24. The method of claim 16, wherein performing the one or more first interference mitigation processes comprises reducing gain at the apparatus for communication with the first UE.

25. The method of claim 16, wherein performing the one or more first interference mitigation processes comprises:

shaping an antenna beam of the apparatus; and limiting energy transmitted towards the first UE in a frequency range associated with the first ultra-wideband channel.

26. The method of claim 16, wherein the method comprises determining the area associated with the number of ultra-wideband ranging sessions that exceed the threshold frequency based on information from one or more other apparatuses about a plurality of ultra-wideband ranging sessions.

27. The method of claim 16, wherein the method comprises:

determining the second UE is located within the threshold distance of the area at a time within a first time period; and performing the one or more second interference mitigation processes for the second UE based on the second UE being located within the threshold distance of the area and at the time within the first time period.

28. The method of claim 27, wherein the method comprises determining the area associated with the number of ultra-wideband ranging sessions that exceed the threshold frequency within the first time period based on information from one or more other apparatuses about a plurality of ultra-wideband ranging sessions.

29. The method of claim 16, wherein the method comprises performing the one or more first interference mitigation processes to reduce channel interference in a second ultra-wideband channel adjacent to the first ultra-wideband channel used for the first ultra-wideband ranging session.

30. A method for wireless communications by an apparatus, comprising:

receiving, from a first user equipment (UE), first signaling indicating an initiation of a first ultra-wideband ranging session between the first UE and an ultra-wideband device;

determining a location of the first UE after receiving the first signaling; and performing one or more first interference mitigation processes configured to reduce channel interference in a first ultra-wideband channel used for the first ultra-wideband ranging session based on, at least, the location of the first UE, wherein:

the apparatus serves the first UE and a second UE; and the method further comprises:

determining a location of the second UE is within an area that includes a third UE;

determining a network entity that serves the third UE is involved in a performance of one or more second interference mitigation processes configured to reduce channel interference in a second ultra-wideband channel for a second ultra-wideband ranging session that involves the third UE; and performing one or more third interference mitigation processes for the second UE based on, at least, the location of the second UE within the area that includes the third UE.

* * * * *